United States Patent
Yanagihara

(10) Patent No.: US 7,970,935 B2
(45) Date of Patent: Jun. 28, 2011

(54) NETWORK SYSTEM, INFORMATION PROCESSOR, AND INFORMATION PROCESSING PROGRAM RECORDING MEDIUM

(75) Inventor: Yasushi Yanagihara, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 238 days.

(21) Appl. No.: 12/007,024

(22) Filed: Jan. 4, 2008

(65) Prior Publication Data
US 2008/0273474 A1    Nov. 6, 2008

(30) Foreign Application Priority Data
Mar. 30, 2007    (JP) ................... 2007-090770

(51) Int. Cl.
*G06F 15/173*    (2006.01)
(52) U.S. Cl. ............ 709/244; 709/242; 370/256
(58) Field of Classification Search .......... 709/242, 709/244; 370/256
See application file for complete search history.

(56) References Cited

U.S. PATENT DOCUMENTS

| | | | | |
|---|---|---|---|---|
| 5,535,195 A * | 7/1996 | Lee | | 370/256 |
| 5,748,736 A * | 5/1998 | Mittra | | 713/163 |
| 6,078,590 A * | 6/2000 | Farinacci et al. | | 370/432 |
| 6,731,608 B2 * | 5/2004 | Iliadis | | 370/256 |
| 7,007,040 B1 * | 2/2006 | Duke et al. | | 707/200 |
| 7,546,380 B2 * | 6/2009 | Kouvelas et al. | | 709/242 |
| 2002/0150094 A1 * | 10/2002 | Cheng et al. | | 370/389 |
| 2004/0143672 A1 * | 7/2004 | Padmanabham et al. | | 709/231 |
| 2005/0027782 A1 * | 2/2005 | Jalan et al. | | 709/200 |

FOREIGN PATENT DOCUMENTS

| | | |
|---|---|---|
| JP | A 2006-33514 | 2/2006 |
| JP | A 2006-59133 | 3/2006 |
| JP | A 2006-197400 | 7/2006 |
| JP | A 2006-287351 | 10/2006 |

* cited by examiner

*Primary Examiner* — Dohm Chankong
*Assistant Examiner* — Thomas J Dailey
(74) *Attorney, Agent, or Firm* — Oliff & Berridge, PLC

(57) ABSTRACT

A content distribution system in which content is distributed from a broadcasting station via a plurality of nodes connected in a hierarchical tree structure, including: a base tree obtained by connecting the plurality of nodes in a hierarchical tree structure using the broadcasting station as an apex; an extension tree obtained by connecting the plurality of other nodes in a hierarchical tree structure using, as an apex, a first root node as any of the nodes included in the base tree; and a topology controller for controlling a topology of each of the nodes belonging to the base tree.

The first root node controls the topology of each of the nodes belonging to the extension tree using the first root node as an apex.

12 Claims, 18 Drawing Sheets

BT

NETWORK SYSTEM, INFORMATION PROCESSOR, AND INFORMATION PROCESSING PROGRAM RECORDING MEDIUM

CROSS REFERENCE TO RELATED APPLICATIONS

The present application claims priority from Japanese Patent Application NO. 2007-090770, which was filed on Mar. 30, 2007, the disclosure of which is herein incorporated by reference in its entirety.

BACKGROUND OF THE INVENTION

1. Field of the Invention

The present invention belongs to the technical fields of a network system, an information processor, and a recording medium storing information programs. More specifically, the invention belongs to the technical fields of a distributed network system in which a distributor delivers information to information processors that connects each other in a hierarchical fashion for relaying the information from end to end stepwisely.

2. Description of Related Art

In recent years, as the speed of the Internet line for home use increases, a network system is being widespread. In the network system, a network is constructed by connecting a plurality of personal computers or the like in houses or the like in a hierarchical tree structure using, at its apex, one distribution server as a distributor. Via the network, so-called content such as music and movies as distribution information is distributed from the distribution server.

The network will be called "topology" from the viewpoint of the logical network connection aspect. In the topology of such a network, each of the personal computers constructing the network is generally called a "node". Further, for example, Japanese Patent Application Laid-Open (JP-A) No. 2006-287351 (FIGS. 1 and 2) discloses a conventional technique of the network system.

In the technique disclosed in JP-A No. 2006-287351, in the case where a new node newly participates in a network system having a hierarchical tree structure, first, the new node sends an inquiry to newly participate in the network system to a topology controller. A connection request is sent from the new node to a connection destination node (any of nodes already participating in the network system) which information is included in a reply from topology controller to the inquiry. The new node is newly connected to the immediately downstream side of the connection destination node. In such a manner, the new node newly joins the network system.

In this case, the topology controller controls the topologies (connection destinations) of all of nodes belonging to the network system.

SUMMARY OF THE INVENTION

However, the technique of JP-A No. 2006-287351 has a problem such that, since a single topology controller controls the topologies of all of the nodes, when the number of nodes becomes enormous in the network system, the topology controller becomes overloaded.

In this case, when the topology controller becomes overloaded, for example, even when a new node transmits request information to join the network system, the reply including information of a corresponding connection destination from the topology controller is delayed, or useless time is required to reconstruct a topology when a node leaves the network system. At worst, a problem occurs such that when anode leaves the upstream side, distribution of content to downstream side has the potential of disruption.

On the other hand, from the viewpoint of stability of content distribution or failure resistance in a network system having the hierarchical tree structure, the topologies of nodes belonging to the network system are desirably managed intensively.

The present invention has been achieved in view of the problems and demands. The goal of present invention is to provide a network system, a node included in the network system, and a recording medium where a control program for controlling the operation in the node is recorded, capable of realizing, in good balance, both reduction in the processing load on a topology controller and improvement in stability in distribution of content of the network system.

In order to solve the above problem, the invention according to claim 1 relates to a network system in which distribution information is distributed from a distributor device via a plurality of information processors connected in a hierarchical tree structure, comprising:

a first sub-network system established by connecting the plurality of information processors in a hierarchical tree structure using the distributor device as an apex;

a second sub-network system established by connecting the plurality of other information processors in a hierarchical tree structure using, as an apex, an apex information processor which is any of the information processors included in the first sub-network system; and a topology controller for controlling a logical network connection aspect of each of the information processors belonging to the first sub-network system, wherein the apex information processor has control means for controlling the logical network connection aspect of each of the information processors belonging to the second sub-network system using the apex information processor as the apex.

DETAILED DESCRIPTION OF THE PREFERRED EMBODIMENTS

Appropriate examples for implementing the present invention will now be described with reference to the drawings. The following embodiments relate to the cases of applying the present invention to a so-called content distribution system of a hierarchical tree type (hereinafter, simply referred to as a "distribution system").

(I) First Embodiment

Figure 1:
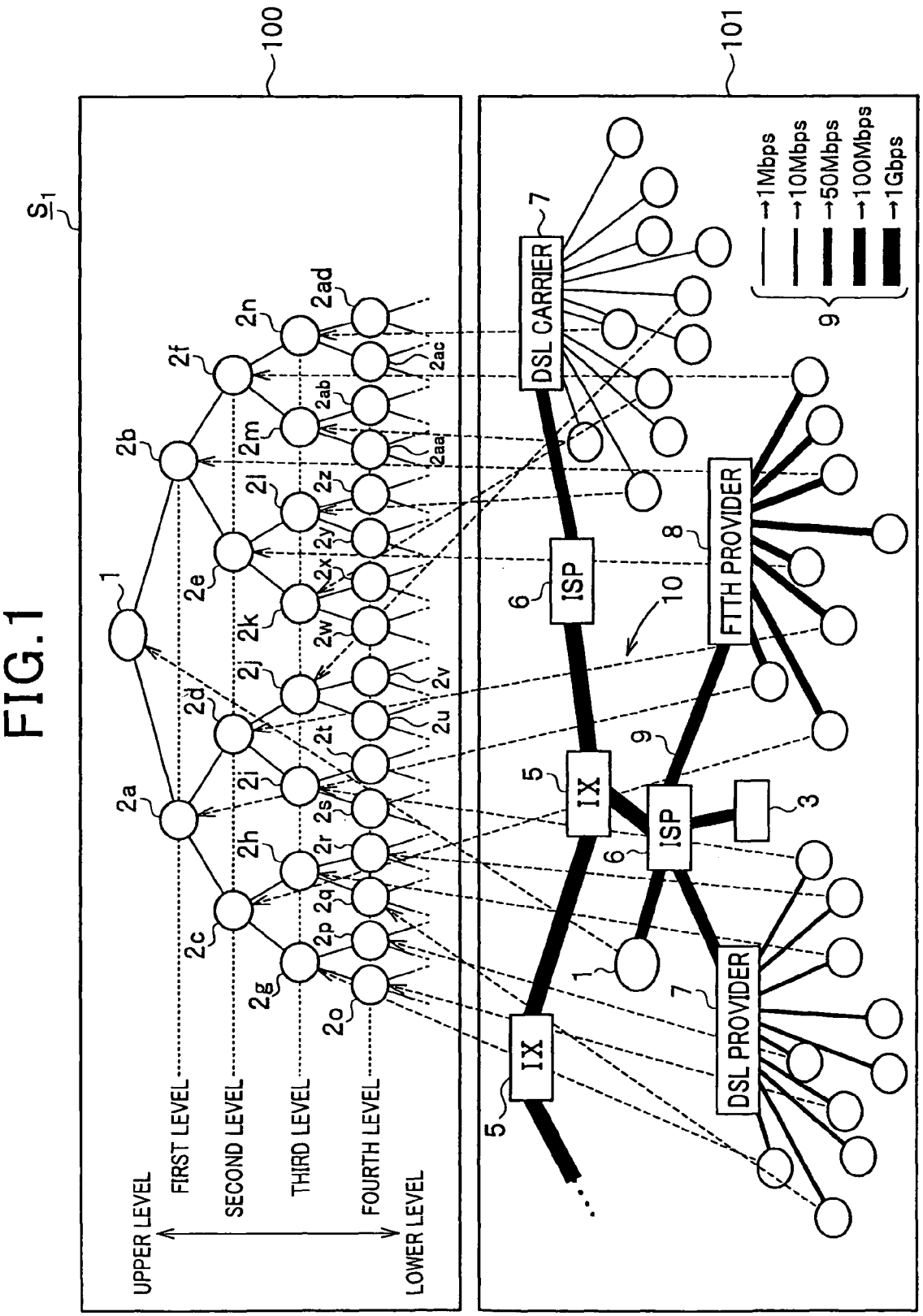
FIG. 1 is a block diagram showing a schematic configuration of a distribution system of a first embodiment.
Figure 2:
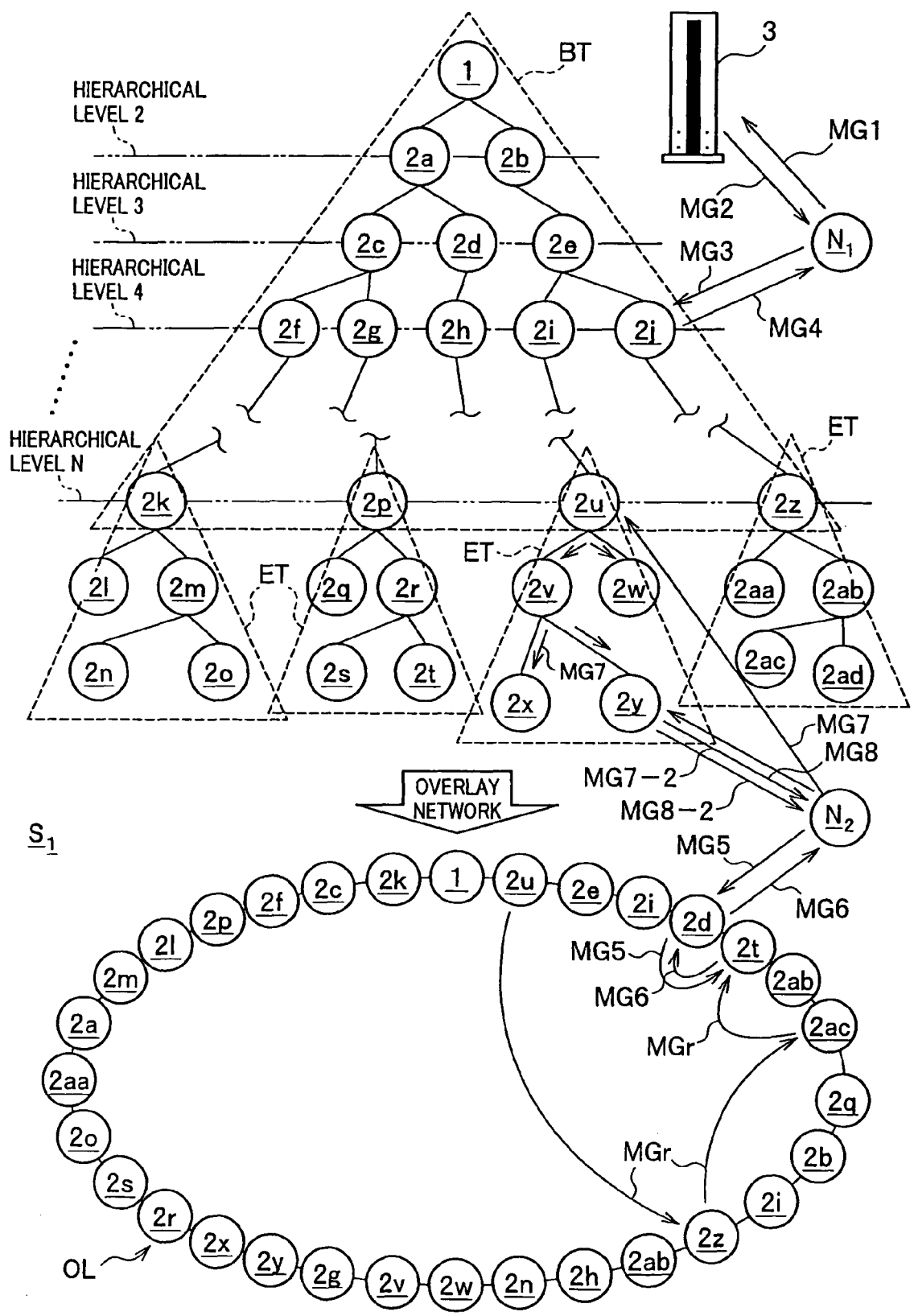
FIG. 2 is a block diagram showing a detailed configuration of the distribution system of the first embodiment.
Figure 3:
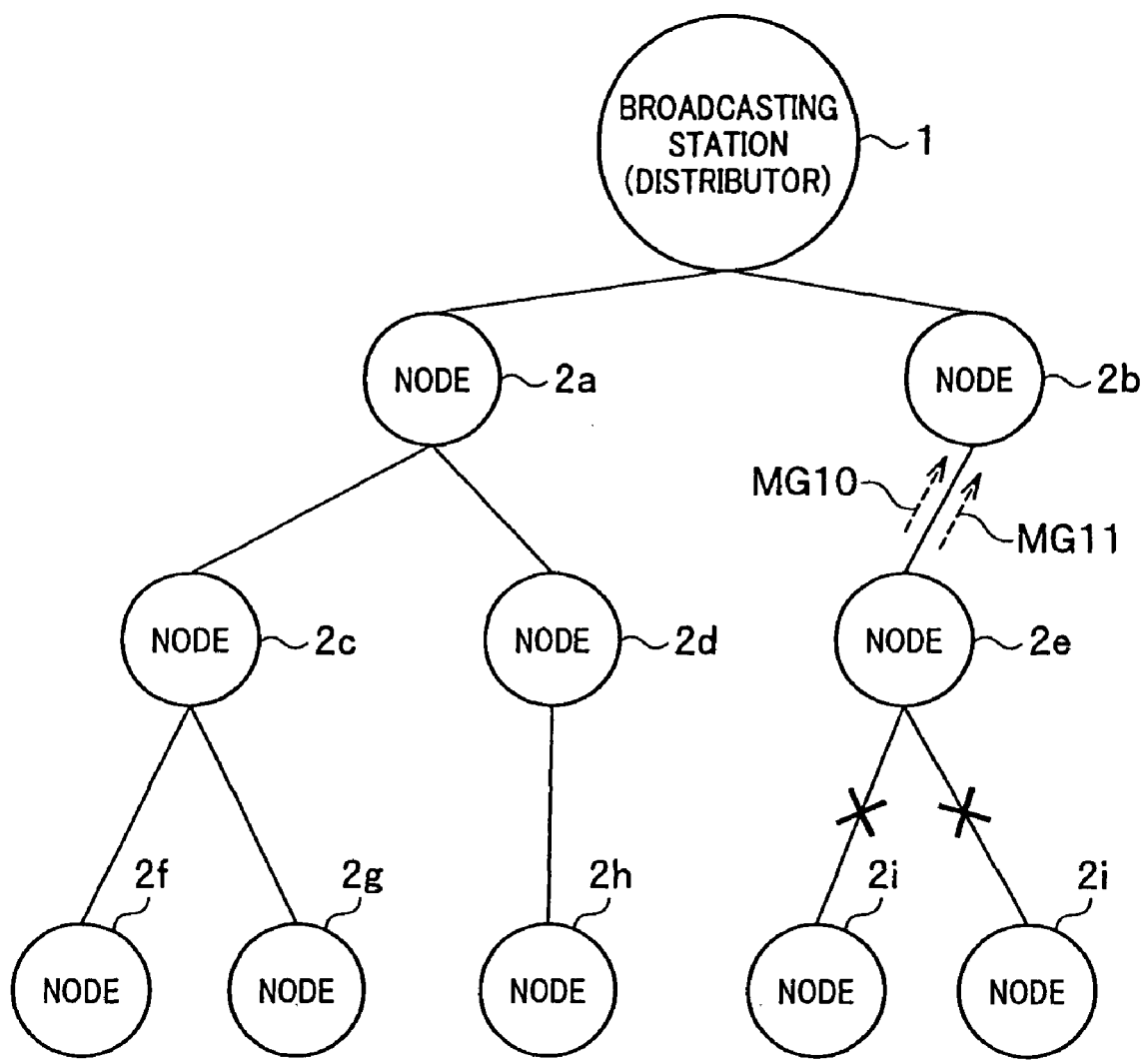
FIG. 3 is a diagram (I) showing a leaving process in the distribution system of the first embodiment.
Figure 4:
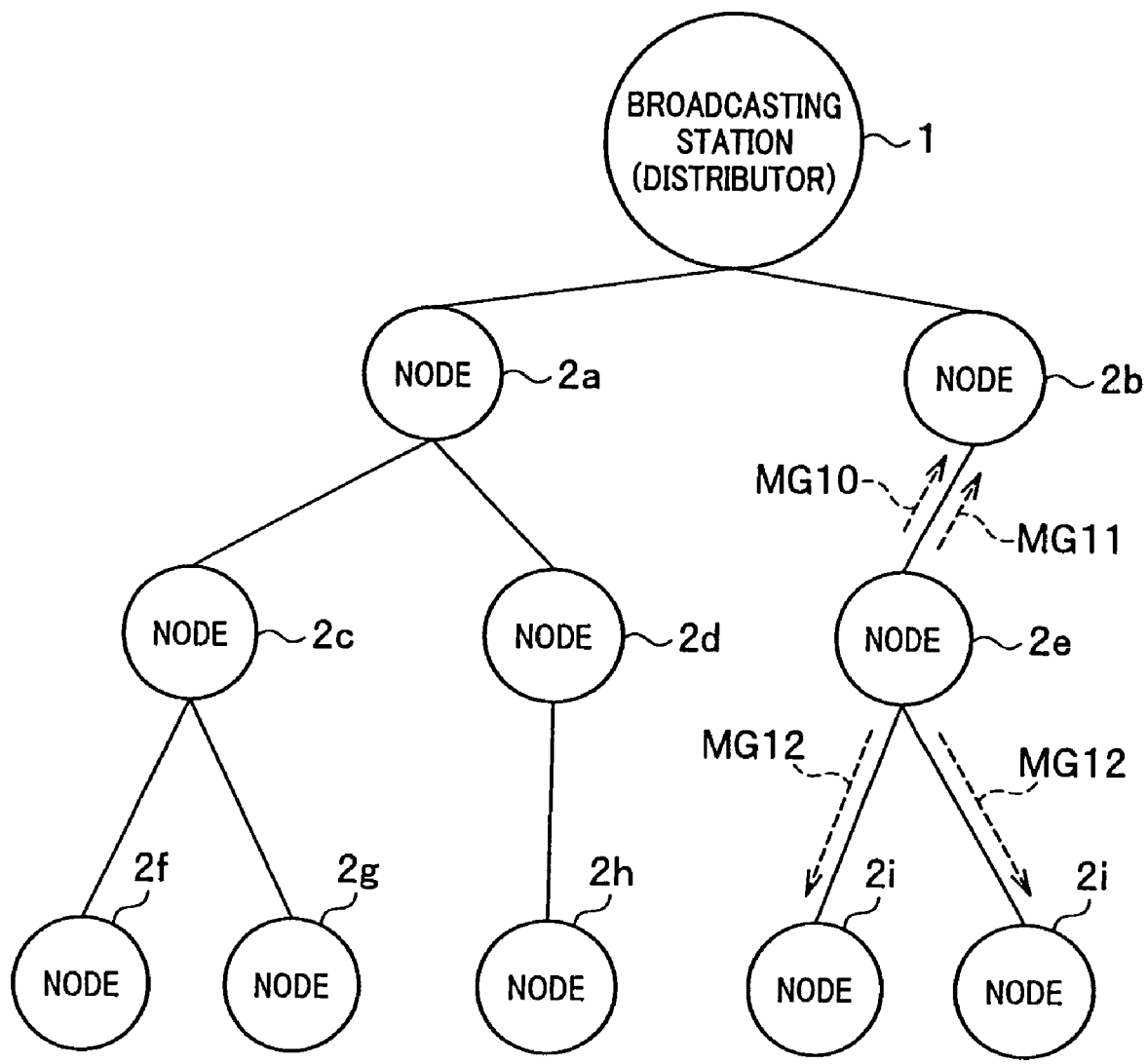
FIG. 4 is a diagram (II) showing the leaving process in the distribution system of the first embodiment.

A first embodiment according to the present invention will be described with reference to FIGS. 1 to 4. FIGS. 1 and 2 are diagrams showing an example of a logical network connection aspect of nodes constructing a distribution system of the first embodiment. FIGS. 3 and 4 are diagrams showing processes in the case where a node leaves the distribution system.

(A) General Configuration of Distribution System

First, a schematic configuration and function of the distribution system of the first embodiment will be described with reference to FIG. 1.

As shown in FIG. 1, a distribution system $S_1$ of the first embodiment is constructed by using a network (network in the real world) such as the Internet. Concretely, for example, as shown in a lower frame 101 in FIG. 1, a network 10 of the real world includes IXs (Internet exchanges) 5, ISPs (Internet Service Providers) 6, DSL (Digital Subscriber Line) providers (apparatuses) 7, FTTH (Fiber To The Home) providers (apparatuses) 8, routers (not shown), and communication lines (for example, telephone lines, optical cables, and the like) 9. In the lower frame 101 in FIG. 1, thicknesses of solid lines corresponding to the communication lines 9 express widths of bands (for example, data transfer speeds) of the communication lines 9.

The distribution system $S_1$ of the first embodiment includes a broadcasting station 1 as a distributor of (continuous) packets each corresponding to a distribution unit of content to be distributed and a plurality of nodes 2a, 2b, 2c, 2d, . . . . Based on the network 10 shown in the lower frame 101 in FIG. 1, the distribution system $S_1$ is constructed as shown in an upper frame 100 in FIG. 1. The broadcast station 1 is used as the apex (the top), and the plurality of nodes 2 is connected in a tree shape via communication paths while forming a plurality of levels (four levels in an example of FIG. 1). The plural continuous packets are distributed while being relayed by the nodes 2 from upstream (upper level) to downstream (lower level). In the following description, in the case of referring to any of the nodes 2a, 2b, 2c, 2d, . . . , it will be simply referred to as a node 2 for convenience.

The broadcasting station 1 is actually realized as a broadcasting station apparatus including a hard disk drive or the like as storage for storing content data to be broadcasted, a controller for controlling distribution of the content, or an interface device for controlling input/output of content data or the like to/from the network 10. The node 2 is actually realized as a node of a personal computer, a so-called set-top box, or the like which is equipped in a house and can be connected to the Internet.

In FIG. 1, the nodes 2 shown in the upper frame 100 participate in the distribution system $S_1$. To participate in the distribution system $S_1$, a node, which is not participating, has to send a participation request message to a topology controller 3 (in the lower frame 101 in FIG. 1) and has to be authorized for participation by the topology controller 3.

By using a not-shown topology database, the topology controller 3 manages location information (for example, IP (Internet Protocol) address and a port number (such as standby port number) of the broadcasting station 1 and each of the nodes 2 participating in the distribution system $S_1$ and topological information showing topologies (logical network connection aspects) between the broadcasting station 1 and the nodes 2 and among the nodes 2 in the distribution system $S_1$. The topology controller 3 authorizes a participation request from a not-participating node and notifies the node of the location information of the participating node 2 as a connection destination, in other words, the participating node 2 selected in consideration of a hierarchical-tree-shaped topology. Consequently, the node to which the location information is notified (which is to participate in the distribution system $S_1$) establishes a connection to the participating node 2 to thereby participate in the distribution system $S_1$.

The hierarchical-tree-shaped topology in the distribution system $S_1$ is allowed to be determined in consideration of the maximum number, balance (symmetry), and the like of nodes 2 on the downstream side directly connected to each of the nodes 2, in addition, for example, the locality between the nodes 2 as proximity metric on physical networks.

In the case such that the power supply of the participating node 2 is turned off or the communication state on the node 2 becomes failed, they correspond to the event that the node 2 leaves the distribution system $S_1$. Consequently, the nodes 2 and the like on the downstream side directly connected to the left node 2 have to obtain the new location information of the other participating nodes 2 as new connection destinations from the topology controller 3 and have to establish a connection.

Further, the hierarchical-tree-shaped topology is formed each broadcasting station 1, in other words, each broadcast channel. That is, in the upper frame 100 in FIG. 1, only one broadcast channel is shown (there is also a case that a single broadcasting station 1 device performs broadcasting in a plurality of broadcast channels). For example, when a participating node 2 switches the current channel to another channel, the node 2 obtains the location information of another participating node 2 belongs to the switched broadcast channel from the topology controller 3 and establishes a connection.

(B) Configuration of Base Tree and Extension Tree in First Embodiment

Next, the configuration of the topology in the distribution system $S_1$ in the first embodiment and processes performed to newly-participate in the distribution system $S_1$ will be described more concretely with reference to FIG. 2.

As shown in FIG. 2, the distribution system $S_1$ having the hierarchical-tree-shaped topology including the broadcasting station 1 as the apex is constructed by two kinds of sub-networks; a base tree sub-network BT (hereinafter, simply referred to as a base tree BT) and one or plural extension tree sub-networks ET (hereinafter, simply referred to as extension trees ET).

In the configuration, the base tree BT is formed by broadcasting station 1 as the root and nodes 2 that connect in the form of hierarchical-tree-shaped topology.

On the other hand, each of the extension trees ET is formed by the node 2 that is located at the N-th level node 2 (in the case of FIG. 2, the nodes 2k, 2p, 2u, and 2z) in BT as the root of ET and the nodes 2 belongs to ET in the form of hierarchical-tree-shaped topology. For example, the extension tree ET at the left end in FIG. 2 is constructed by connecting nodes 2l, 2m, 2n, and 2o in a hierarchical tree structure using the node 2k as the apex.

In the matter of the level number ("N" in the case of FIG. 2) of the base tree BT to which the nodes 2 as the apexes of the extension trees ET belong is preset in the topology controller 3. When a node 2 newly connected to the level corresponding to the level number N, a message that the node 2 should participate in the apex of the extension tree ET is notified to the node 2 by the topology controller 3 at the time of participation of the node 2. The level number is basically preset on the basis of the performance of the topology controller 3 itself, in other words, the throughput of topology controlling process and the like.

It is necessary to assign an apparatus having the specified throughput or higher as the topology controller 3 so that the distribution system $S_1$ can assure to make a response (an upstream node candidate message MG2 which will be described later) within the specified time even when upstream node introduction request messages MG1 (which will be described later issued to the topology controller 3 by a plurality of nodes 2 participating in the base tree BT for a reason such as switching of a channel, re-connection, or the like) concentrate on the topology controller 3. In the case of using a prevalent personal computer or the like as the topology controller 3, the number of participating nodes 2 which can be accepted by the base tree BT is, for example, about 10,000. Based on the number, that corresponds to the 14 layers tree topology on condition that the tree is binary tree.

With respect to the ratio between sizes of the hierarchical trees of the base tree BT and each of the extension trees ET, concretely, it is preferable to make the size of the extension tree ET smaller than that of the base tree BT. Generally, one of the basic properties of a distribution system having the hierarchical-tree-type topology is low fastness property due to topological fluctuations. Consequently, by making the size of the extension tree ET which is not managed with the topology controller 3 smaller than that of the size of the base tree BT, the influence of the low fastness property can be minimized. More concretely, for example, in the case of aiming at making 1,000,000 nodes 2 participate in the distribution system $S_1$ for example, as described above, a hierarchical tree of 10,000 nodes, and total 8,000 small-sized extension trees ET are formed, in each of which 200 nodes participate (more than 8,000 nodes 2 for the root node of the extension trees ET can be assured in the 14th level of the base tree BT).

(C) Process of Participating In Distribution System in First Embodiment

Next, processes performed in the case where a new node 2 participates in the distribution system $S_1$ constructed by the trees will be described.

As described above, two trees of different properties, that is, the base tree BT and the extension tree ET are included in the distribution system $S_1$. Therefore, the procedures of participating in the trees are different from each other.

A change in the topology of the base tree BT is controlled by the topology controller 3 in each of the case where a new node 2 participates in the base tree BT and the case where a node 2 already participating in the base tree BT leaves the base tree BT.

More concretely, when a node $N_1$ shown in FIG. 2 newly participates in the base tree BT, the node $N_1$ sends the upstream node introduction request message MG1 related to the participation request to the topology controller 3. When the participation is authorized by the topology controller 3 and the upstream node candidate message MG2 including the information of participation authorization and location information of the participating node 2 on the immediately upstream side (the node 2j in FIG. 2) is sent, the new node $N_1$ sends a connection request message MG3 to the participating node 2 (in node 2j in FIG. 2) indicated by the location information. In response to the message, a connection acceptance response message MG4 is obtained from the node 2 (2j), the node $N_1$ is connected immediately downstream side of the node 2 (2j), and it completes the process of making the node $N_1$ participate in the base tree BT.

In the case where the level to which the newly participating node N1 belongs is preset as a level to which the node 2 to be connected to the apex of each extension tree ET belongs (the N-th level in the case of FIG. 2), the topology controller 3 notifies the information that the node $N_1$ is the apex of the extension tree ET.

On the other hand, a change in the topology of an extension tree ET in the case where a new node 2 participates in the extension tree ET or a node 2 which is participating in the extension tree ET leaves is controlled by the node 2 connected to the apex of the extension tree ET, functioning as a root node in a overlay network using a distributed hash table (DHT) to be described below (the node 2 connected to the apex of an extension tree ET and functioning as the root node will be called a first root node).

Outline of the DHT algorithm will be described.

All of the nodes 2 belonging to the distribution system $S_1$ in the first embodiment form a hierarchical-tree-shaped topology in the base tree BT and the extension trees ET and, in addition, form an over lay network OL based on the DHT algorithm. Since the base tree BT and the extension trees ET themselves can be also said as an overlay network when viewed from a real network shown in the lower frame 101 in FIG. 1, the overlay network OL will be called a second overlay network OL.

In the DHT algorithm, in the distribution system $S_1$ to which a number of nodes 2 belong, one node 2 stores only the location information of the minimum nodes 2 participating in the distribution system $S_1$, and receives the location information of the other nodes 2, which is not stored in the node 2, by relaying the location information among the other nodes 2 so that necessary content data is delivered. For more details, for example, paragraphs [0037] to [0072] in the specification and FIGS. 1 to 5 of JP-A No. 2006-197400 can be referred to. When the node 2 connected to the apex of the extension tree ET in the first embodiment is notified of the information that the node 2 is to be connected to the apex from the topology controller 3 when the node 2 participates in the base tree BT, the node 2 sends a first root node registration request message MGr for registering the node 2 as the first root node on the second overlay network OL to the inside of the second overlay network OL. Accordingly, the node 2 (the node 2t in FIG. 2) as a root node form an aging the first root nodes on the basis of the DHT algorithm (hereinafter, a root node for storing and managing the location information and the like of the first root nodes will be called a second root node) is registered as the first root node. The nodes 2 (nodes 2z and 2ac in FIG. 2) via which the first root node registration request message MGr is relayed until the message MGr reaches the second root node 2t store the first root node registration request message MGr (that is, the node 2u is becoming a new first root node) at the time of relaying. After that, the nodes 2 act as so-called cache nodes in the DHT algorithm.

For example, when the node $N_2$ shown in FIG. 2 newly participates in the extension tree ET using the node $2u$ as the first root node, the node $N_2$ is connected to the node $2d$ as a node closest to the node itself (on the overlay network OL) participating in the second overlay network OL, and sends a first root node search request message MG5. According to the DHT algorithm, the message MG5 is transferred to the second root node $2t$. When a first root node search result message MG6 including the location information of the first root node $2u$ is transmitted via the node $2d$ from the second root node $2t$, the newly participating node $N_2$ sends an upstream node introduction request message MG7 to the extension tree ET (using the node $2u$ as the first root node) to the first root node $2u$ indicated by the location information. Thereby, the upstream node introduction request message MG7 is transferred from the first root node $2u$ to the downstream direction. Finally, from one or plural participating nodes 2 (node $2y$ in FIG. 2) satisfying the conditions included in the upstream node introduction request message MG7, an upstream node candidate message MG7-2 including the location information of the node is sent to the node $N_2$.

The node $N_2$ which has received the upstream node candidate message MG7-2 from the one or plural nodes 2 selects any one of nodes 2 by a preset method from the nodes 2 which have sent the upstream node candidate messages MG7-2, and transmits a connection request message MG8 to the selected node 2. When the connection acceptance response message MG8-2 is sent from the node 2 (the node $2y$ in FIG. 2), the node $N_2$ is newly connected to the immediately downstream side of the node 2 ($2y$), and it completes the process of making the node $N_2$ participate in the extension tree ET using the node $2u$ as the first root node.

After a new node 2 participates in each of the base tree BT and the extension trees ET, content data of content distributed from the broadcasting station 1 is relayed from the upstream side to the downstream side in the hierarchical level in the base tree BT and the extension trees ET, thereby distributing the content to the nodes 2. In the distribution process, the first root node in each of the extension trees ET functions as a relay node for relaying the content data received by itself as it is to the nodes 2 connected to the downstream side.

(D) Process of Leaving Distribution System in First Embodiment

Next, a process of leaving the distribution system $S_1$ in the first embodiment will be described with reference to FIGS. 3 and 4. In the process of leaving the distribution system $S_1$, the leaving process is executed similarly in both of the case where any of the nodes 2 participating in the base tree BT leaves and the case where any of the nodes 2 participating in the extension tree ET leaves.

FIGS. 3 and 4 show the case where the node $2e$ leaves the base tree BT due to, for example, turn-off of the power switch. In the following, two kinds of leaving processes on the nodes $2i$ and $2j$ connected immediately downstream of the node $2e$ leaving will be described with reference to FIGS. 3 and 4.

In the leaving process, as shown in FIGS. 3 and 4, the leaving node $2e$ sends a data transmission stop request message MG10 and a connection cancellation request message MG11 to an upstream node (the node $2b$ in FIGS. 3 and 4) as the supplier of content to the node $2e$.

The node $2b$ which has received the two request messages stops the content relaying process, thereby stopping distribution of content to the node $2e$ leaving and, concurrently, deletes the information of the node $2e$ from the node management information in the node $2b$, thereby disconnecting the node $2e$. As a result, distribution of content to the node $2e$ leaving the node $2b$ is stopped. In the case where other nodes (in FIGS. 3 and 4, the nodes $2i$ and $2j$) exist on the immediately downstream side of the node $2e$ leaving, a process of restoring a path of distributing content to the nodes 2 on the downstream side is performed by using any of the following two methods.

A first example of the restoring process is a so-called time-out method. In the time-out method, each of the nodes 2 (including the nodes $2i$ and $2j$) constructing the distribution system $S_1$ always monitors the distribution state of content from the node 2 connected to the immediately upstream side. Using interruption of distribution of the content for preset time (indicated by "X" mark in FIG. 3) as a trigger, it is regarded that the node 2 ($2e$) on the immediately upstream side leaves, connection to the node 2 ($2e$) is interrupted, and a process of connecting to a new node 2 on the upstream side starts (refer to FIG. 2).

A second example of the restoring process is a so-called event notifying method. In the event notifying method, each of the nodes 2 participating in the distribution system $S_1$ does not execute a monitoring process such as the time-out method shown in FIG. 3. On leaving the topology as the distribution system $S_1$, the node $2e$ transmits the data transmission stop request message MG10 and the connection cancellation request message MG11 to the nodes $2i$ and $2j$ connected immediately downstream thereof, and transmits a leaving report message MG12 indicating that the node $2e$ itself leaves. On receipt of the leaving report message MG12 from the node $2e$ on the immediately upstream side, the nodes $2i$ and $2j$ interrupt the connection to the node $2e$ and starts the process of connection to another upstream node 2 (refer to FIG. 2).

By the process described above, also after the node $2e$ leaving the distribution system $S_1$, distribution of content to the nodes $2i$ and $2j$ immediately downstream of the node $2e$ is continued.

(II) Second Embodiment

Figure 5:
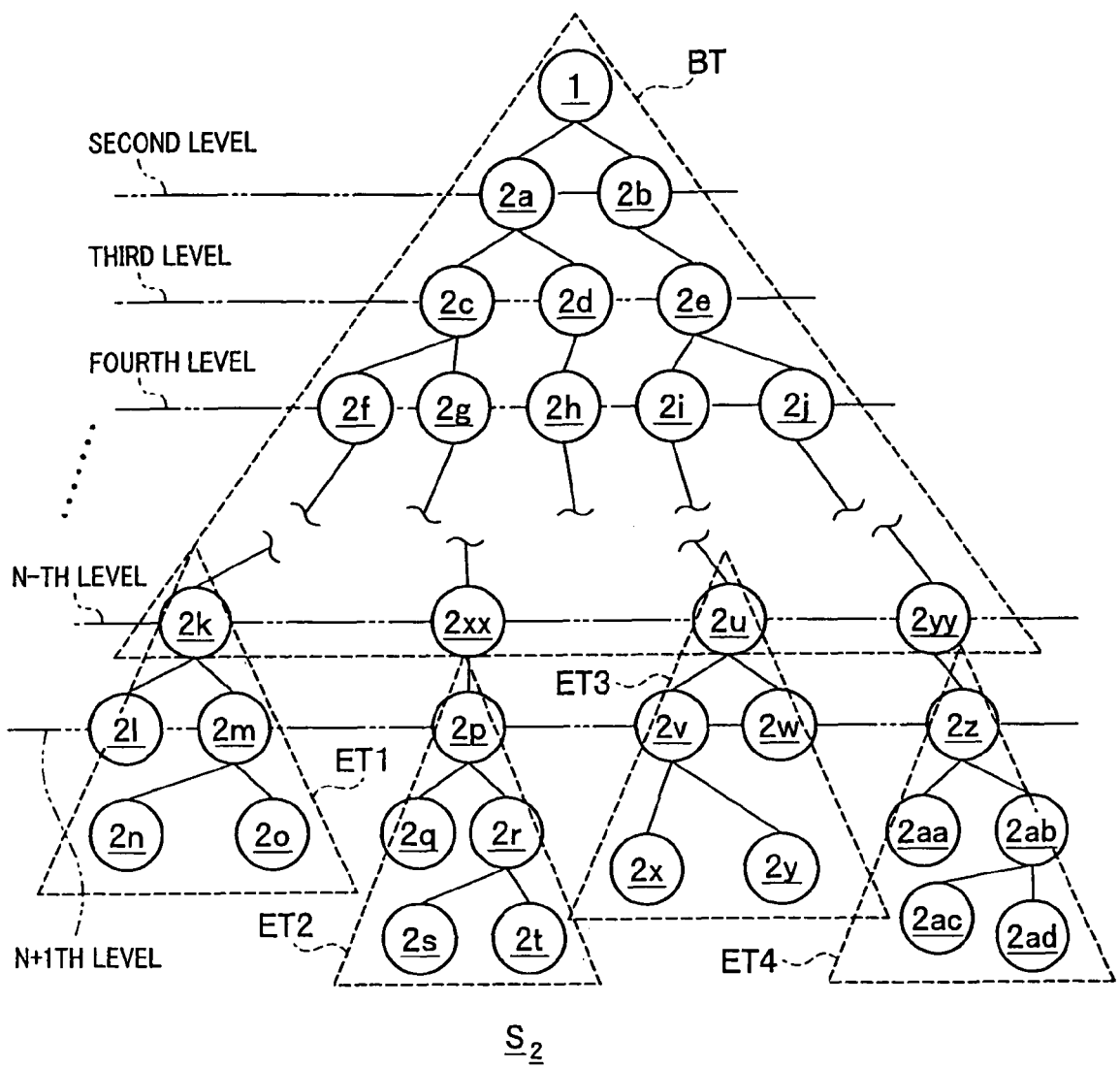
FIG. 5 is a block diagram showing a detailed configuration of a distribution system of a second embodiment.

A second embodiment according to the present invention will now be described with reference to FIG. 5. FIG. 5 is a diagram showing an example of the logical network connection aspect of nodes constructing a distribution system of the second embodiment. The same reference numerals are designated to components similar to those of the distribution system $S_1$ in the first embodiment shown in FIG. 2, and description of the details of the similar components will be omitted.

In the distribution system $S_1$ of the first embodiment, the number of levels in the base tree BT to which the first root nodes at the apexes of the extension trees ET belong is constant (N in the example of FIG. 2) in all of the extension trees ET. The number of levels is preset on the basis of the throughput or the like of the topology controller 3.

On the other hand, in the distribution system of the second embodiment described below, the number of levels in the base tree BT in which the first root node as the apex of the extension tree ET participates is not constant. Nodes 2 as the first root nodes are connected in a plurality of levels in the base tree BT.

Specifically, as shown in FIG. 5, the first root nodes in, for example, extension trees ET1 and ET3 out of the extension trees ET included in a distribution system $S_2$ of the second embodiment are nodes $2k$ and $2u$ belonging to the N-th level in the base tree BT. The first root nodes of the extension trees ET2 and ET4 are nodes $2p$ and $2z$ belonging to the N+1-th level in the base tree BT.

In the distribution system $S_2$ of the second embodiment, a node 2 belonging to any level is pre-set as the first root node of the extension tree ET by the topology controller 3 on the basis of the throughput of the topology controller 3 and, in addition, control of the topology as the base tree BT, and the like. Considering the balance of the hierarchical tree of the distribution system $S_2$ as a whole, desirably, a node 2 belonging to levels near the end of the base tree and a plurality of levels is selected as the first root node.

A process for making a node 2 newly participate in the distribution system $S_2$ in the second embodiment and a process for leaving an already participating node 2 from the distribution system $S_2$ are similar to the process for making a node 2 newly participate in the distribution system $S_1$ in the first embodiment and the process for leaving an already participating node 2 from the distribution system $S_1$, respectively, except for the point that designation of the first root node as the apex of the extension tree ET is not limited to a node 2 belonging to a single level in the base tree BT. Therefore, description of the details will be omitted.

(III) Third Embodiment

Figure 6:
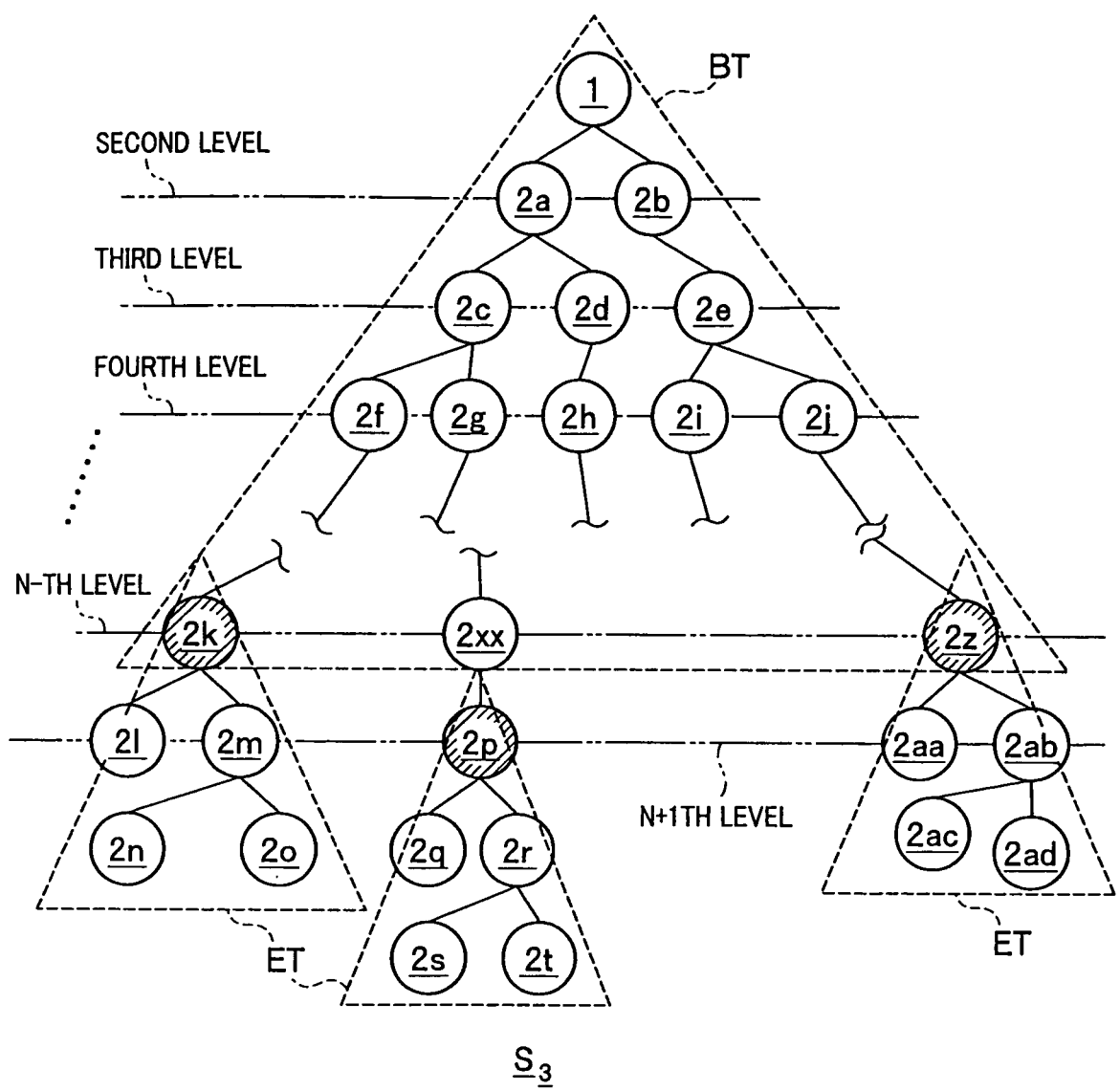
FIG. 6 is a block diagram showing a detailed configuration of a distribution system of a third embodiment.

A third embodiment according to the present invention will now be described with reference to FIG. 6. FIG. 6 is a diagram showing an example of the logical network connection aspect of nodes constructing a distribution system of the third embodiment. The same reference numerals are designated to components similar to those of the distribution system $S_1$ in the first embodiment shown in FIG. 2, and description of the details of the similar components will be omitted.

In the distribution systems $S_1$ and $S_2$ of the first and second embodiments, a level in the base tree BT to which the first root node as the apex of the extension tree ET is to belong is pre-set by the topology controller 3 on the basis of the throughput of the topology controller 3 itself.

In contrast, in the distribution system of the third embodiment described below, the node 2 serving as the first root node at the apex of the extension tree is selected in consideration of not only the throughput of the topology controller 3 but also the attributes of the nodes 2 participating in the base tree BT.

Specifically, in a distribution system $S_3$ of the third embodiment, the topology controller 3 stores information of the throughput of each of the nodes 2 participating in the base tree BT and information of time (period) of participation in the base tree BT to each node 2. At the time of selecting the first root node of each of the extension trees ET from the nodes 2 participating in the base tree BT, the topology controller 3 selects, as the first root node, only a node 2 whose throughput or participation time indicated in the stored information on the basis of the stored information as shown in FIG. 6. In the case shown in FIG. 6, the hatched nodes 2k, 2p, and 2z have the throughput or participation time greater than the reference. The nodes 2 are selected as first root nodes in the extension trees ET.

As the throughput, for example, bandwidth of data communication which can be used for distributing content data, processing speed of a CPU or the like as the component of the node 2, or the like is considered.

In the third embodiment, a node 2 as the first root node is selected by the topology controller 3 by, basically, placing priority on the throughput and participation time more than the level in the base tree BT, to which a node belongs.

(IV) Fourth Embodiment

Figure 7:
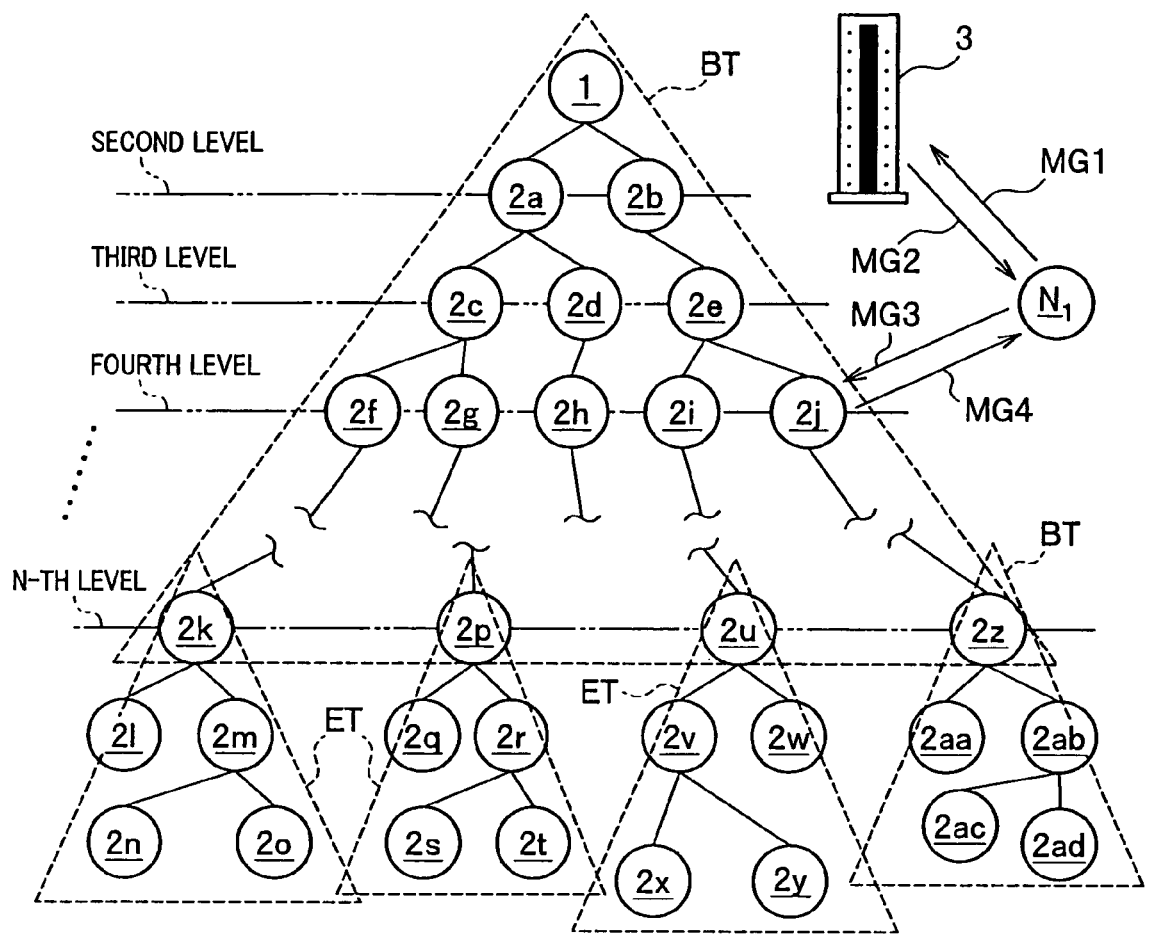
FIG. 7 is a block diagram showing a detailed configuration of a distribution system of a fourth embodiment.
Figure 7:
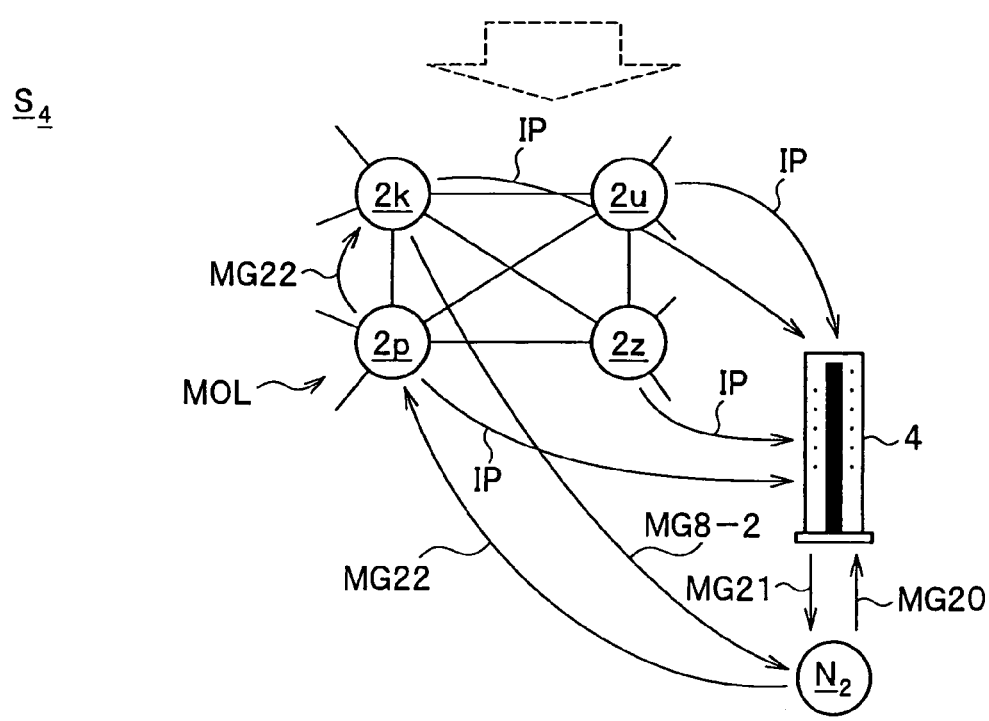

Finally, a fourth embodiment according to the present invention will be described with reference to FIG. 7. FIG. 7 is a diagram showing an example of the logical network connection aspect of nodes constructing a distribution system of the fourth embodiment. The same reference numerals are designated to components similar to those of the distribution system $S_1$ in the first embodiment shown in FIG. 2, and description of the details of the similar components will be omitted.

In the distribution system $S_1$ of the first embodiment, the extension trees ET construct a second overlay network OL. In the case of participating in any of the extension trees ET, via a second root node that stores and manages the location information of a first root node on the second overlay network OL, the location information of the first root node is obtained.

In contrast, in a distribution system $S_4$ of the fourth embodiment described below, as shown in FIG. 7, the first root nodes of the extension trees ET construct another mesh-type overlay network MOL different from the second overlay network OL. Location information IP of nodes 2 (as the first root nodes) participating in the overlay network MOL is stored in a cache server 4 provided on the outside of the overlay network MOL. The configurations of the base tree BT and the topology controller 3 included in the distribution system $S_4$ in the fourth embodiment may be any of the configurations in the first to third embodiments.

In the case where there is a node $N_2$ which is newly participating in the distribution system $S_4$ of the fourth embodiment, the node $N_2$ sends a first root node introduction request message MG20 indicative of a request for introduction of any of the nodes 2 (first root nodes) participating in the overlay network MOL to the cache server 4 and receives a first root node candidate message MG21 including the location information IP of any of the nodes 2 as a reply to the message MG20.

After that, the node $N_2$ sends a first root node search request message MG22 to the node 2 (node 2p in FIG. 7) whose location information IP was obtained. When the node 2p which has received the first root node search request message MG22 does not have conditions meeting the connection conditions of the node $N_2$ newly participating, the node 2p relays the first root node search request message MG22 to another neighboring first root node (for example, the node 2k in the case of FIG. 7) participating in the overlay network MOL.

When the first root node search request message MG22 is relayed to the first root node (the node 2k in the case of FIG. 7) meeting the connection conditions of the newly participating node $N_2$ by repeating the processes in the overlay network MOL, the connection acceptance response message MG8-2 is sent back from the node 2k to the newly participating node $N_2$. Thereby, it completes the process of participation of the node $N_2$ to the extension tree ET (in the case of FIG. 7, the extension tree ET using the node 2k as the first root node).

First Example

Next, concrete configurations and processes of the broadcasting station 1, the nodes 2, and the topology controller 3 belonging to the distribution system $S_1$ of the first embodiment will be described as a first example with reference to FIGS. 8 to 14.

Figure 8:
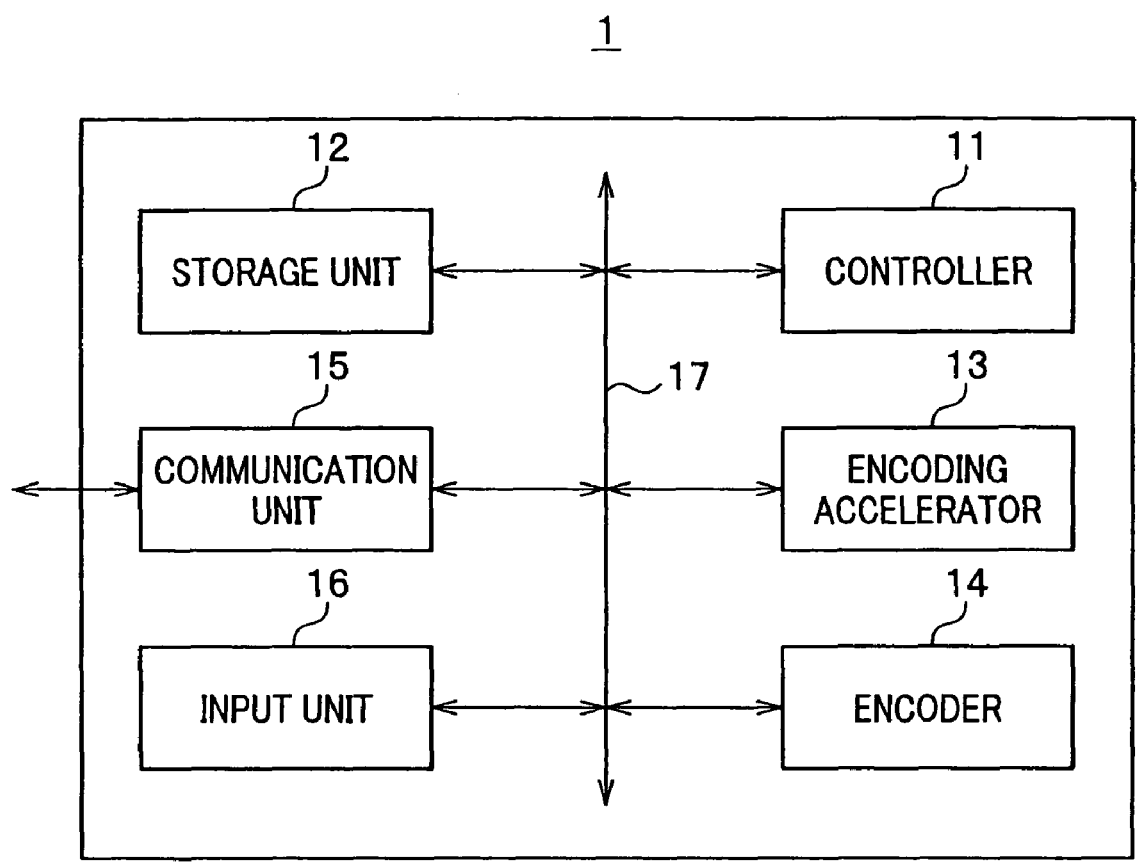
FIG. 8 is a block diagram showing a schematic configuration of a broadcasting station in each of examples.
Figure 9:
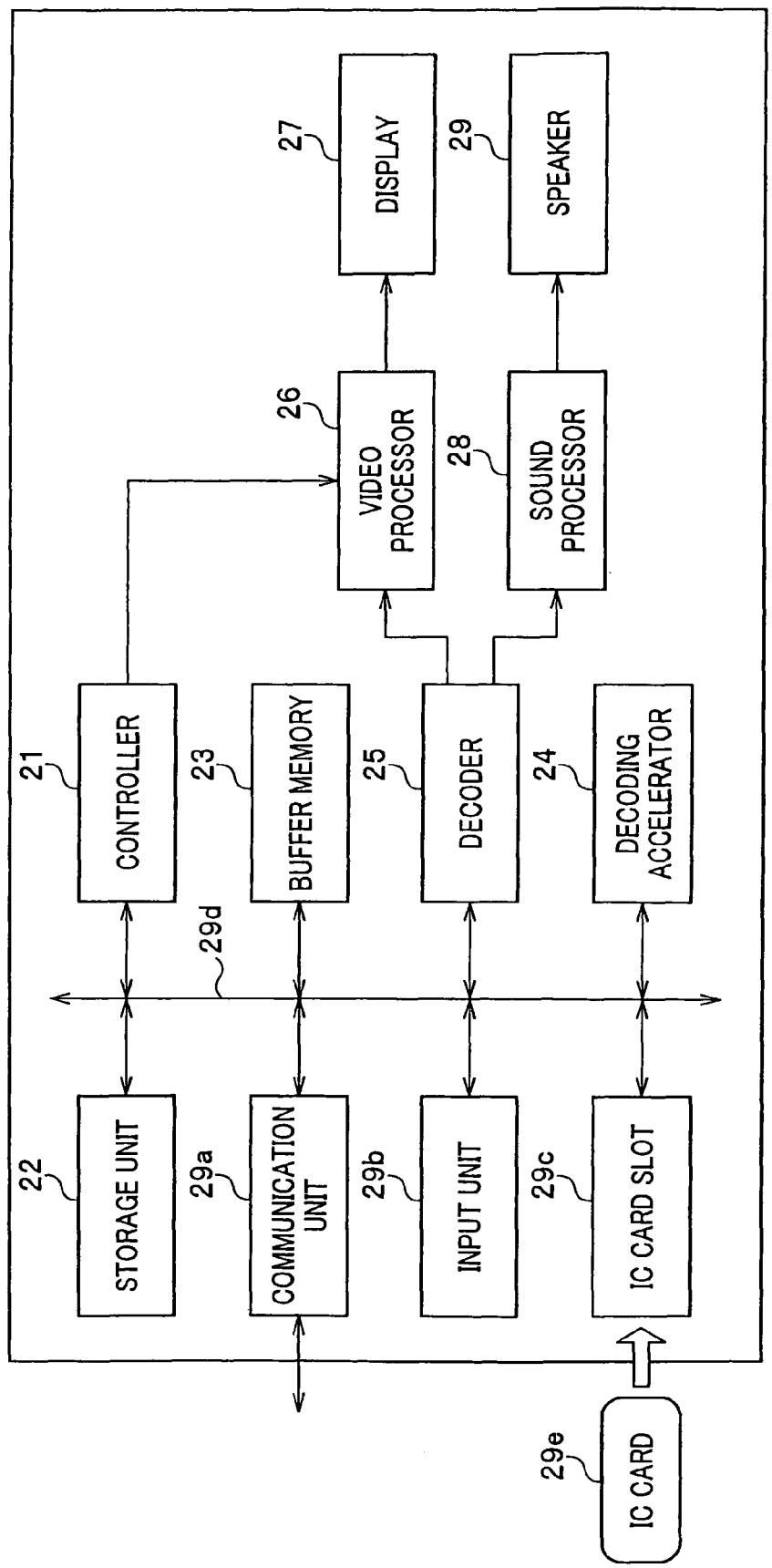
FIG. 9 is a block diagram showing a schematic configuration of a node in each of the examples.
Figure 10:
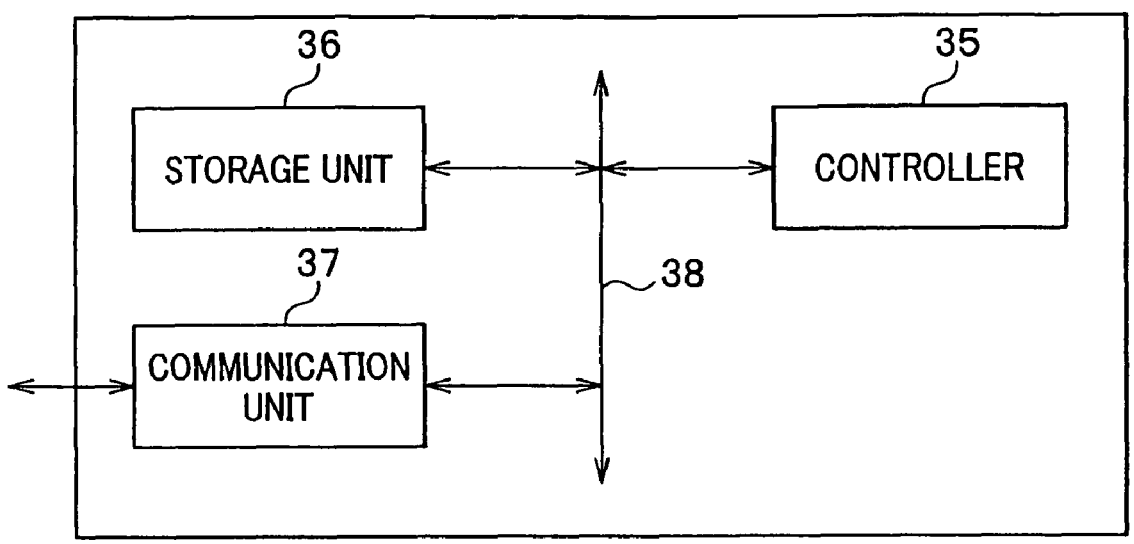
FIG. 10 is a block diagram showing a schematic configuration of a topology controller in each of the examples.
Figure 11:
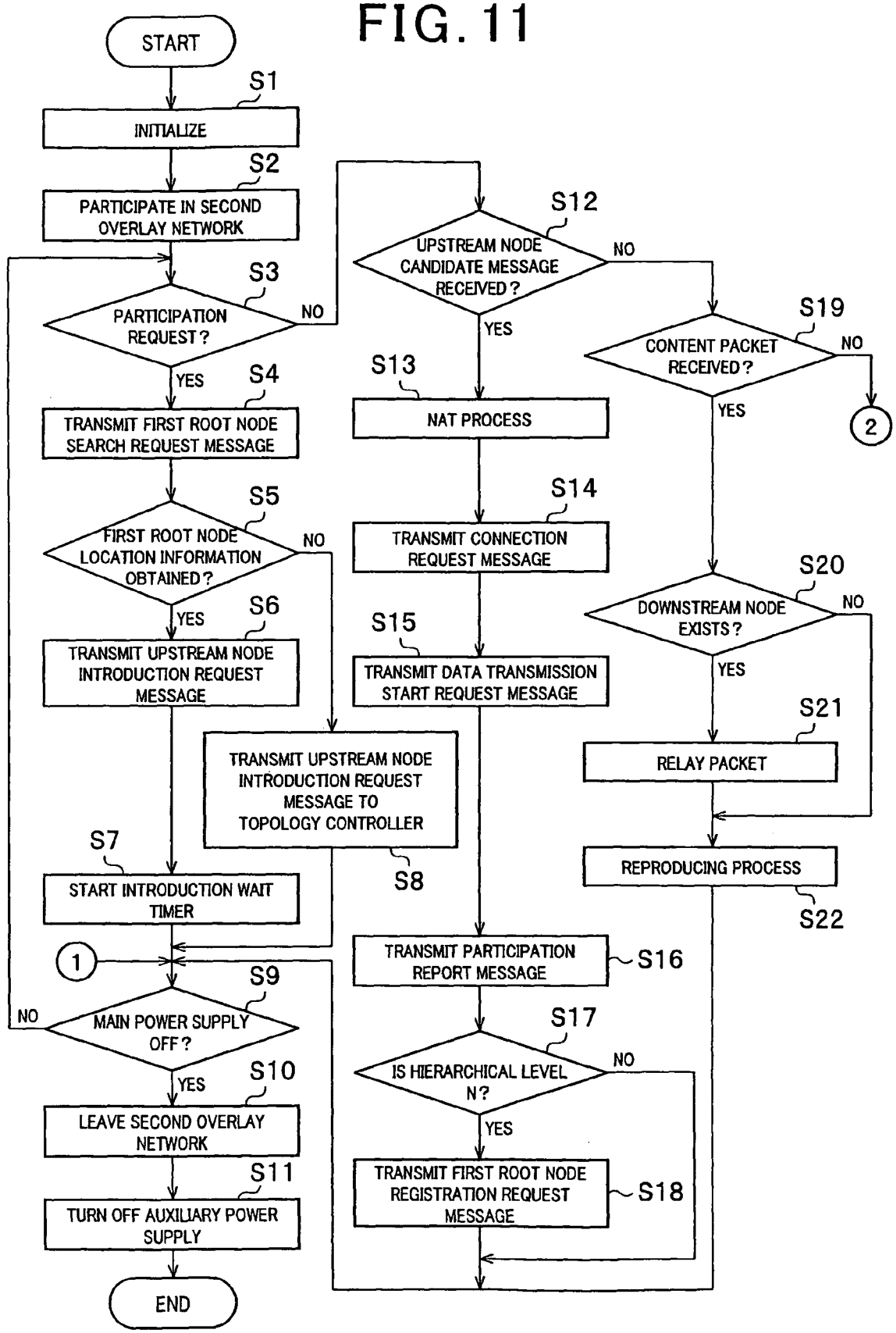
FIG. 11 is a flowchart (I) showing processes in the node in the first example.
Figure 12:
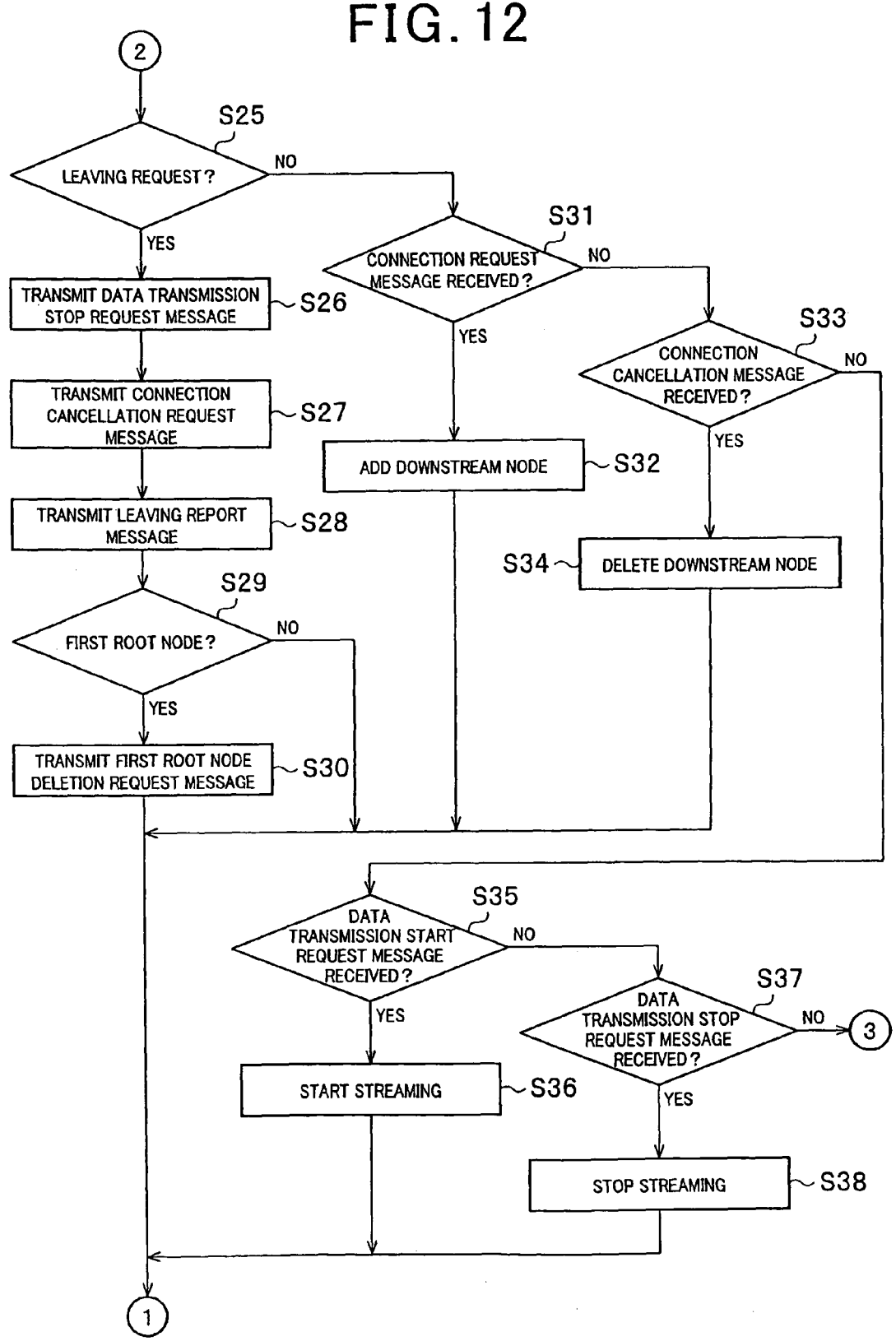
FIG. 12 is a flowchart (II) showing processes in the node in the first example.
Figure 13:
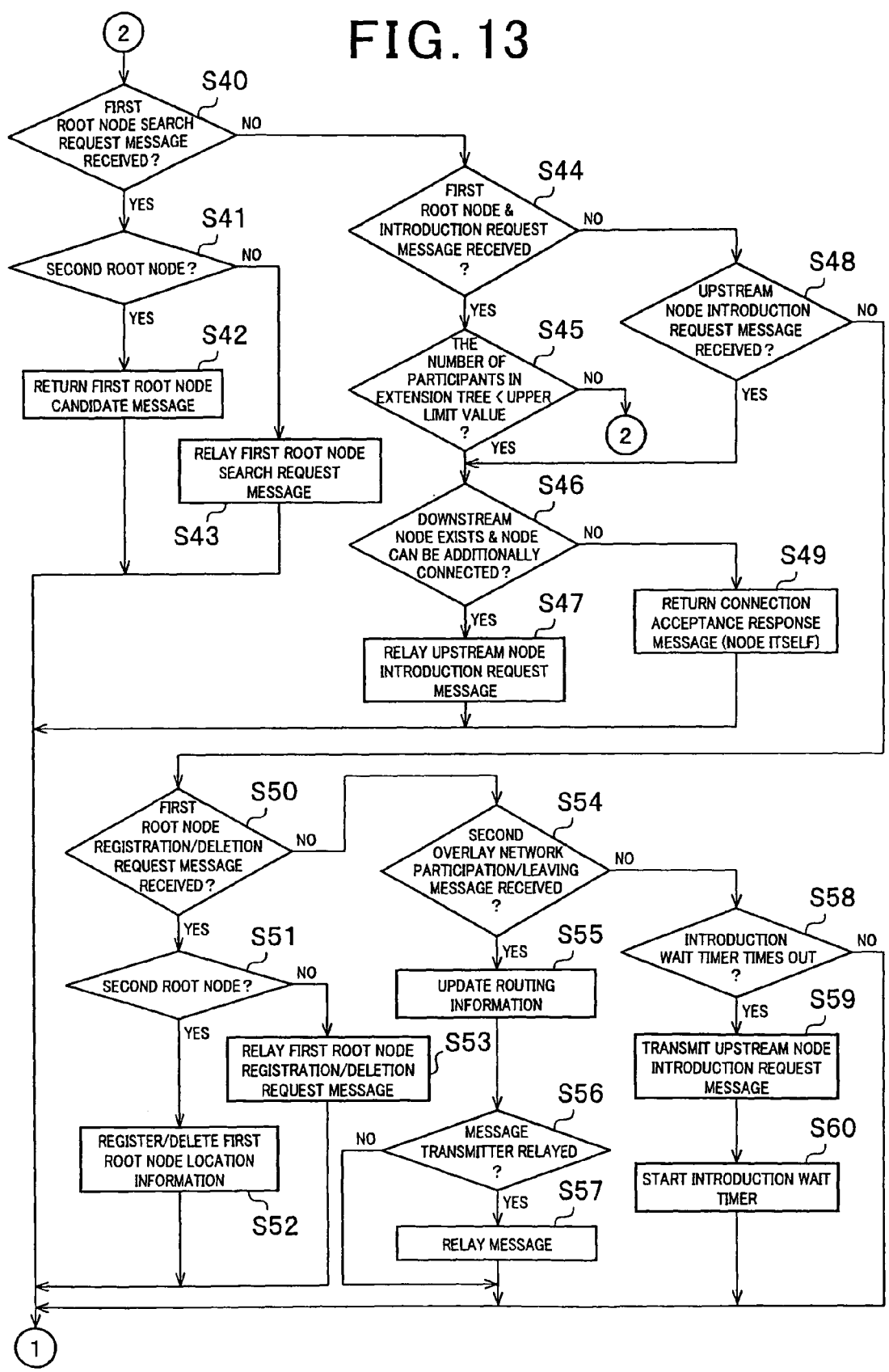
FIG. 13 is a flowchart (III) showing processes in the node in the first example.
Figure 14:
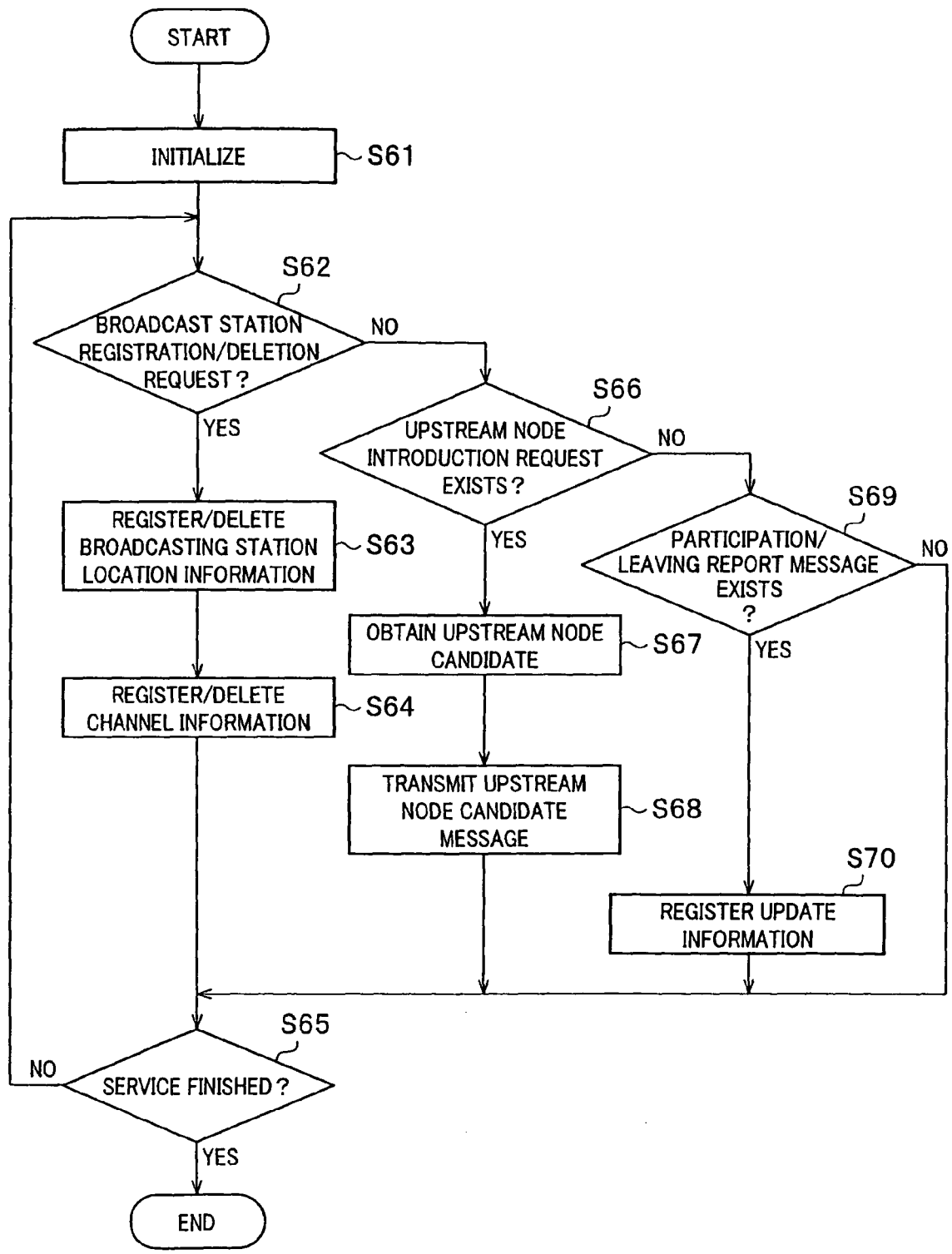
FIG. 14 is a flowchart showing processes in the topology controller in the first example.

FIG. 8 is a block diagram showing a detailed configuration of the broadcasting station 1 of the first example. FIG. 9 is a block diagram representatively showing a detailed configuration of any of the nodes 2 in the first example. FIG. 10 is a block diagram showing a detailed configuration of the topology controller 3 of the first example. FIGS. 11 to 13 are flowcharts showing processes according to the first example executed in the representative node 2. FIG. 14 is a flowchart showing processes according to the first example executed in the topology controller 3.

First, schematic configuration and schematic operation of the broadcasting station 1 of the first example will be described with reference to FIG. 8.

As shown in FIG. 8, the broadcasting station 1 includes a controller 11 constructed by a CPU having computing function, a work RAM, a ROM for storing various data and programs (an OS (operating system) and various applications), and the like, a storage 12 made by an HDD or the like for storing the content data (packets), an encoding accelerator 13 for encoding content data with a cipher key, an encoder 14 for converting the content data into a specified data format, a communication unit 15 for controlling communication of information with the node 2 or the like via a communication line or the like, and an input unit (for example, a keyboard, a mouse, and the like) 16 for receiving an instruction from the user (operator) and giving an instruction signal according to the instruction to the controller 11. The components are connected to each other via a bus 17.

In the configuration, the controller 11 controls the whole broadcasting station 1 by making the CPU execute a program stored in the storage 12 or the like, converts the data format of the content data stored in the storage 12 by using the encoder 14, makes the encoding accelerator 13 encode the content data with a cipher key, divides the content data by predetermined data amounts to generate the plural continuous packets, and distributes a stream of the packets to the nodes 2 (nodes 2a and 2b in the upper frame 100 of FIG. 1) via the communication unit 15.

In the payload portions of the data packets, packet numbers continuous from the head of the content data are written.

The controller 11 determines the destination to which the content data is distributed with reference to a logical network connection aspect (topology) table stored in the storage 12. In the topology table, at least the IP address and the port number of a node 2 to be connected to the broadcasting station 1, in other words, a node 2 to which content data is to be distributed are written.

Next, schematic configuration and schematic operation of each of the nodes 2 in the first example will be described with reference to FIG. 9.

As shown in FIG. 9, the node 2 in the first example has a controller 21 as control means constructed by a CPU having computing function, a work RAM, a ROM for storing various data and programs (an OS (operating system) and various applications), and the like, a storage 22 as storing means made by an HDD or the like for storing various data, a program, and the like, a buffer memory 23 for temporarily accumulating (storing) received content data, a decoding accelerator 24 for decoding encoded content data accumulated in the buffer memory 23 with a decipher key, a decoder 25 for decoding (compressing) video data, audio data, and the like included in the decoded content data and reproducing the data, a video processor 26 for performing a predetermined drawing process on the reproduced video data and the like and outputting the processed data as a video signal, a display 27 such as a CRT, a liquid crystal display, or the like for displaying a video image on the basis of the video signal output from the video processor 26, a sound processor 28 for D/A (digital-to-analog) converting the reproduced audio data to an analog sound signal, amplifying the signal, and outputting the amplified signal, a speaker 29 for outputting, as sound waves, the sound signal output from the sound processor 28, a communication unit 29a for controlling a communication between the broadcasting station 1 and another node 2 or the like via a communication line or the like, an input unit (for example, a mouse, a keyboard, an operation panel, a remote controller, or the like) 29b for outputting an instruction signal according to each of various instructions from the user (viewer) to the controller 21, and an IC card slot 29c for reading/writing information from/to an IC card 29e. The controller 21, storage 22, buffer memory 23, decoding accelerator 24, decoder 25, communication unit 29a, input unit 29b, and IC card slot 29c are connected to each other via a bus 29d.

The IC card 29e has tampering resistance, that is, a tampering measure is taken so that secret data can be prevented from being read and easily analyzed by unauthorized means. For example, the IC card 29e is distributed to the user of each of the nodes 2 from the administrator of the distribution system S or the like. The IC card 29e is constructed by an IC card controller made by a CPU, a nonvolatile memory such as an EEPROM having tampering resistance, and the like. In the nonvolatile memory, the user ID, a decoding key for decoding encoded content data, a digital certificate, and the like. When a node 2 participates in a distribution system S, the digital certificate is transmitted together with the upstream node introduction request message MG1 (including the location information of the node 2) to the topology controller 3.

On the other hand, the buffer memory 23 is, for example, an FIFO (First In First Out) type ring buffer memory. Under control of the controller 21, content data received via the communication unit 29a is temporarily stored into a storage area indicated by a reception pointer.

The controller 21 controls the node 2 integrally by making the CPU read and execute a program stored in the storage 22 or the like, receives a plurality of packets distributed from the upstream via the communication unit 29a, writes the packets into the buffer memory 23, reads packets (packets received in the past for predetermined time) stored in the buffer memory 23, and transmits (relays) the packets to the node 2 on the downstream side via the communication unit 29a. In addition, the buffer memory 23 reads the packets stored in the storage area in the buffer memory 23 indicated by a reproduction pointer and outputs the read packets to the decoding accelerator 24 and the decoder 25 via the bus 29d.

For example, the program may be downloaded from a predetermined server on the network 10 or recorded on a recording medium such as a CD-ROM and read via a drive of the recording medium.

Finally, schematic configuration and schematic operation of the topology controller 3 of the first example will be described with reference to FIG. 10.

As shown in FIG. 10, the topology controller 3 of the first example has a controller 35 as apex information processor designating means constructed by a CPU having computing function, a work RAM, a ROM for storing various data and programs (including an OS (operating system) and various applications), and the like, a storage 36 made by an HDD or the like for storing various data and the like, and a communication unit 37 for controlling communication of information with a node 2 or the like via the network 10. The components are connected to each other via a bus 38.

In the configuration, a database is stored in the storage 36. The database stores location information of the broadcasting station 1 and the nodes 2 participating in the distribution system $S_1$ and topological information between the broadcasting station 1 and the nodes 2 and among the nodes 2 in the distribution system $S_1$.

The controller 35 controls the topology controller 3 generally by making the CPU included in the controller 35 execute a program stored in the storage 36 or the like. When the upstream node introduction request message MG1 is transmitted from a node 2 which is not participating, for example, the node $N_1$ illustrated in FIG. 2, the above-described authorizing process such as a process of determining validity of a digital certificate attached to a participation request is performed. When the digital certificate is valid, the location information of the node $N_1$ and a digest of the digital certificate, for example, a hash value obtained by hashing the digital certification with a predetermined hash function is stored in the database.

When the authentication is valid, the controller 35 sends the upstream node candidate message MG2 to the node $N_1$ which has sent the upstream node introduction request message MG1 via the communication unit 37. The message MG2 includes the location information and hierarchical level information of a plurality of upstream nodes 2 as connection destination candidates, that is, information indicating the hierarchical level of each of the upstream nodes 2. In the node N, which receives the upstream node candidate message MG2, network proximities in the distribution system $S_1$ of the plurality of upstream nodes 2 as connection destination candidates are compared with each other. The upstream node 2 existing in the position closest to the node $N_1$ is selected. By transmission/reception of the connection request message MG3 and the connection acceptance response message MG4 to/from the upstream node 2, a connection is established. The location information of the upstream node 2 whose connection is established is sent (returned) to the topology controller 3. In contrast, the controller 35 stores the topological information of the node $N_1$ into the database.

Next, the processes according to the first example in the node 2 and the topology controller 3 having the above-described configuration will be concretely described with reference to FIGS. 11 to 14. In the present invention, since the broadcasting station 1 performs processes similar to those of the broadcasting station 1 in the conventional distribution system, description of the processes will be omitted.

(I) Processes in Node

First, processes in the node 2 in the distribution system $S_1$ will be described with reference to FIGS. 11 to 13. Each of the nodes 2 in the first example executes the same processes as those of FIGS. 11 to 13. Consequently, a single node 2 can be the first root node or the second root node in the first example.

With reference to FIG. 11, the participation process (steps S1 to S18 (in FIG. 2)) executed in each of the nodes 2 of the first example to the received packet relaying process and reproducing process (steps S19 to S22) will be described.

As shown in FIG. 11, when a main power source and an auxiliary power source in any of nodes 2 in the first example (hereinafter, a node whose processes will be described will be called a target node 2) are switched on, first, the program stored in the target node 2 and the components are initialized by the controller 21 (step S1). The auxiliary power source is kept on until the power supply to the target node 2 is completely interrupted after turn-off of the main power source.

After completion of the initialization, the controller 21 retrieves another node 2 (the node 2d in the case of FIG. 2) already participating in the second overlay network OL by referring to, for example, a not-shown conventional so-called directory server, sends a not-shown upstream node introduction request message to the already participating node 2, and participates in the second overlay network OL via the node 2d (step S2).

After that, for example, the controller 21 of the target node 2 checks to see whether or not an operation of making the target node 2 participate in the distribution system $S_1$, that is, an operation of requiring reception of content data of the selected channel is performed by an operation of selecting a channel corresponding to the broadcasting station 1 desired to watch executed by the user of the controller 21 (step S3).

When the operation is executed (YES in step S3), the controller 21 transmits the first root node search request message MG5 for actual participation in the distribution system $S_1$ to another node 2 (the node 2d in the case of FIG. 2) known by the target node 2 while using any of the second root nodes (the node 2t in the case of FIG. 2) as a final destination (step S4). When the first root node search request message MG5 is relayed according to the DHT algorithm and reaches the second root node (the node 2t) as the final destination, in response to it, the location information of any of the first root nodes (the node 2u in the case of FIG. 2) is sent back to the target node 2 via the node 2d.

Concurrently, the controller 21 of the target node 2 after transmission of the first root node search request message MG5 monitors whether the location information of one or more nodes 2 has been transmitted or not (step S5). When the location information is transmitted (YES in step S5), the controller 21 transmits the upstream node introduction request message MG7 to the first root node (node 2u) indicated by the transmitted location information (step S6). Waiting for the reply to the message MG7, the controller 21 of the target node 2 starts counting by a not-shown introduction waiting timer in the controller 21 (step S7). The counting by the introduction waiting timer is performed for providing a standby time for a possible case such that the upstream node candidate message MG7-2 is not immediately transmitted as a response to the upstream node introduction request message MG7 considering that all of nodes 2 participating in the distribution system $S_1$ are, for example, personal computers mounted in ordinary houses.

After that, the controller 21 checks whether the power supply switch in the target node 2 is turned off or not (step S9). When the power supply switch is not turned off (NO in step S9), the controller 21 returns to the step S3 and repeats the above-described series of processes. On the other hand, when it is determined in step S9 that the power supply switch is turned off (YES in step S9), the controller 21 turns off the main power source, executes the process of leaving the second overlay network OL (step S10), after that, also turns off the auxiliary power source (step S11), and finishes the processes of the target node 2. Concretely, as the process in the step S10, the controller 21 executes a process of transmitting a not-shown leaving request message to the second root node (the node 2t in the case of FIG. 2) as a final destination via the node 2d.

On the other hand, when it is determined in step S5 that even one piece of the location information of the first root nodes is transmitted (NO in step S5), no first root node which can newly participate (be connected) on the downstream side at that time point exists in the distribution system $S_1$. Therefore, to newly participate in the base tree BT, the controller 21 transmits the upstream node introduction request message Mg1 to the topology controller 3 (step S8 in FIG. 2). After that, the controller 21 shifts to the process in the step S9 and repeats the above-described series of processes.

On the other hand, when it is determined in the step S3 for the first time that the participation operation is not performed or it is determined in the step S3 for the second or subsequent times that the upstream node introduction request message MG1 or MG7 has been transmitted to the topology controller 3 or the first root node (NO in step S3), the controller 21 in the target node 2 checks to see whether or not the upstream node candidate message MG2 or MG7-2 is received from the topology controller 3 or the node 2 in the extension tree ET (step S12).

When the upstream node candidate message MS2 or MS7-2 is received (YES in step S12), the controller 21 selects another node 2 to be connected, that is, either a node 2 in the base tree BT or a node 2 in any of the extension trees ET from the upstream node candidate message MG2 or MG7-2, and executes a so-called NAT (Network Address Translation) process on the selected node 2 (step S13).

The NAT process is executed to pass packets over gateways which are set on the network segment unit basis in order to transmit/receive packets among different network segments.

After completion of the NAT process, the controller 21 sends the connection request message MG3 or MG8 to the node 2 as the target of the NAT process to receive distribution of an actual packet (step S14). In the step S14, when the transmitter of the upstream node candidate message MG2 is the topology controller 3, the controller 21 sends the connection request message MG3 to the node 2 as the connection destination (the node 2j in the case of FIG. 2). On the other hand, when the transmitter of the upstream node candidate message MG7-2 is a node 2 in the extension tree ET, the controller 21 transmits the connection request message MG8 to the introduced node 2 (the node 2y in the case of FIG. 2).

After transmission of the upstream node introduction request message MG3 or MG8, the controller 21 transmits a not-shown data transmission start request message to the corresponding connection destination in order to actually receive content data distributed (step S15). To the data transmission start request message, for example, an MAC (Media Access Control) address of a gateway in a LAN (Local Area Network), information of a cipher communication method used when the target node 2 receives a packet, and the like are attached as security information. After that, the controller 21 sends a message notifying of participation in the topology of the distribution system $S_1$ to the topology controller 3 or the first root node (step S16).

Next, after participation in the topology, the controller 21 checks whether the controller 21 itself (the target node 2 itself) participates in the N-th level in the base tree BT or not, that is, whether the controller 21 itself can be the first root node or not in the base tree BT on the basis of the message notified from the topology controller 3 at the time of participation (step S17). When the controller 21 does not participate in the N-th level (NO in step S17), the controller 21 shifts to the process in the step S9 and repeats the above-described series of processes. When it is determined in the step S17 that the controller 21 participates in the N-th level and can be the first root node (YES in step S17), the controller 21 sends the first root node registration request message MGr to the second root node (step S18 in FIG. 2), after that, shifts to the process in the step S9, and repeats the above-described series of processes.

On the other hand, when it is determined in the step S12 that although the process of participation in the distribution system $S_1$ is complete, the upstream node candidate message MG2 or MG7-2 has not been received yet (NO in step S12), the controller 21 checks to see whether or not a new packet has been received from another node 2 on the upstream side after the participation (step S19).

In the case where no packet is received from the node 2 on the upstream side (NO in step S19), the controller 21 moves to the process shown in FIG. 12 which will be described later. When a packet is received (YES in step S19), the controller 21 checks whether another node 2 connected to the downstream side of the target node 2 exists or not (step S20). When the node 2 on the downstream side exists (YES in step S20), while relaying necessary packets to the node 2 on the downstream side (step S21), the controller 21 outputs the received packet to its decoder 25, and reproduces the decoded content by using the video processor 26 and the sound processor 28 (step S22). After that, the controller 21 moves to the process in the step S9 and repeats the above-described series of processes. In the case where it is determined in the step S20 that the node 2 on the downstream side does not exist (NO in step S20), the controller 21 shifts to the step S22 as it is and executes the reproducing process in itself.

Next, processes after the process in the step S19 in which no packet is received from the node 2 on the upstream side (NO in step S19) will be described with reference to FIG. 12. Referring to FIG. 12, the leaving process executed in the target node 2 in the first example (steps S25 to S30), the participation process and the leaving process of another node 2 which is newly participating on the downstream side of the target node 2 (steps S31 to S34), and processes from the start to the end of distribution of content data in the first example (steps S35 to S38) will be described.

When it is determined in the step S19 shown in FIG. 11 that no packet is received (NO in step S19), as shown in FIG. 12, the controller 21 checks to see whether an operation of leaving the distribution system $S_1$ is performed or not in the target node 2 in a packet reception waiting state (step S25).

When the leaving process is performed during the monitoring process in step S25 (YES in step S25), the controller 21 transmits the data transmission stop request message MG10 and the connection cancellation request message MG11 to the immediately upstream node 2 connected at the time point (steps S26 and S27, see FIG. 3 or 4). The controller 21 sends a not-shown leaving report message indicative of leaving the topology of the distribution system $S_1$ to the topology controller 3 (in the case of the target node 2 participating in the base tree BT) or the corresponding first root node (the node 2u in FIG. 2 in the case of the target node 2 participating in the extension tree ET) (step S28).

Next, the controller 21 checks whether the target node 2 itself is the first root node or not (step S29). In the case where the target node 2 is the first root node (YES in step S29), the controller 21 sends a not-shown first root node deletion request message indicative of leaving the target node 2 as the first root node to a corresponding second root node (step S30). When it is determined in the step S29 that the target node 2 is not the first root node (NO in step S29), the controller 21 shifts to the process in the step S9 in FIG. 11 and repeats the series of processes.

On the other hand, when it is determined in step S25 that the leaving operation is not performed (NO in step S25), the controller 21 checks to see whether or not the new connection request message MG3 or MG8 or the connection cancellation request message MG11 is sent from another node 2 connected to the downstream side during monitoring of the operation (steps S31 and S33).

When the connection request message MG3 or MG8 is transmitted (YES in step S31), the controller 21 executes a process of connection to another node 2 on the downstream side by adding (registering) the location information of another node 2 on the downstream side to the node management information stored in the storage 22 in correspondence with the connection request message MG3 or MG8 (step S32). The controller 21 shifts to the step S9 shown in FIG. 11 and repeats the above-described series of processes.

On the other hand, when it is determined in steps S31 and S33 that no new connection request message MG3 or MG8 is not received (NO in step S31) but a new connection cancellation request message MG11 is received (YES in step S33), the controller 21 executes the process of deleting another node 2 on the downstream side by deleting the location information of another node 2 on the downstream side from the node management information in correspondence with the connection cancellation request message MG11 (step S34), shifts to the process in the step S9 shown in FIG. 11, and repeats the series of processes.

Further, when it is determined in step S33 that new connection cancellation request message MG11 is not also received (NO in step S33), the controller 21 checks to see whether the data transmission start request message is received from another node 2 connected to the downstream side or not (step S35).

When the data transmission start request message is received (YES in step S35), in response to the data transmission start request message, the controller 21 transmits a packet as normal content data to another node 2 on the downstream side (step S36). The controller 21 shifts to the process in step S9 shown in FIG. 11 and repeats the series of processes.

On the other hand, when it is determined in step S35 that the data transmission start request message is not received (NO in step S35), the controller 21 checks to see whether or not the data transmission stop request message MG10 is received from another node 2 on the downstream side (step S37). When the data transmission stop request message MG10 is not also received (NO in step S37), the controller 21 shifts to the process shown in FIG. 13 which will be described later. On the other hand, when the data transmission stop request message MG10 is received (YES in step S37), the controller 21 stops transmission of packets as content data to another node 2 on the downstream side (step S38), shifts to the process in step S9 shown in FIG. 11, and repeats the series of processes.

Processes performed after it is determined in the step S37 that the data transmission stop request message MG10 is not also received (NO in step S37) will be described with reference to FIG. 13. Referring to FIG. 13, the process of participating in the extension tree ET in the first example will be mainly described.

When it is determined in step S37 shown in FIG. 12 that the data transmission stop request message MG10 is not also received (NO in step S37), the controller 21 checks to see whether the first root node search request message MG5 is received in the target node 2 or not as shown in FIG. 13 (step S40). When the first root node search request message MG5 is received (YES in step S40), the controller 21 checks to see whether the controller 21 itself is the second root node in the target node 2 or not (step S41). When the controller 21 itself functions as the second root node (YES in step S41), the controller 21 sends, as a reply, the first root node search result message MG6 including the location information indicative of any of the first root nodes managed by itself to the node 2 as the transmitter of the first root node search request message MG5 (step S42), shifts the process in step S9 shown in FIG. 11, and repeats the series of processes.

On the other hand, when it is determined in step S41 that the controller 21 itself does not function as the second root node (NO in step S41), to send the first root node search request message MG5 to another node 2 functioning as the second root node, the controller 21 relays the first root node search request message MG5 on the basis of so-called routing information (refer to FIG. 4 in JP-A No. 2006-197400) related to the DHT algorithm (step S43). The controller 21 shifts to the process in the step S9 shown in FIG. 11 and repeats the series of processes.

When it is determined in the step S40 that the first root node search request message MG5 is not received (NO in step S40), the controller 21 checks to see whether the target node 2 itself is the node 2 functioning as the first root node and the upstream node introduction request message MG7 is received or not (step S44). When the target node 2 itself is the node 2 functioning as the first root node and the upstream node introduction request message MG7 is received (YES in step S44), the controller 21 checks to see whether or not the present number of participants in the extension tree ET using the target node 1 itself as the apex is less than a value which is preset as the upper limit value of the number of participants in relation to the permitted number of levels in the base tree BT (step S45). When the number of participants is equal to or larger than the upper limit value (NO in step S45), it becomes difficult for the controller 21 to make the number of nodes 2 which is equal to or larger than present number participate in the extension tree ET managing the target node 2 as the first root node. The controller 21 shifts to the process in the step S9 in FIG. 11 and repeats the series of processes.

On the other hand, when it is determined in step S45 that the number of participants is less than the upper limit value (YES in step S45), the controller 21 checks to see whether or not another node 2 already participates in on the downstream side of the target node 2 as the first root node (the downstream side of the extension tree ET) and a node 2 can be additionally connected to the immediately downstream side of the target node 2 (step S46). When the node 2 can be additionally connected to the immediately downstream side (YES in step S46), the controller 21 relays the upstream node introduction request message MG7 to the another node 2 (step S47), shifts to the process in step S9 shown in FIG. 11, and repeats the series of processes.

In the case of the step S47, the upstream node introduction request message MG7 is relayed any time to the downstream side of the target node 2 as the first root node. At the time point when it is determined that any node 2 on the downstream side can be connected to the immediately downstream side, (in place of sending the connection acceptance response message MG8-2 as a reply to the node 2 as the transmitter of the upstream node introduction request message MG7), relay of the upstream node introduction request message MG7 is stopped.

On the other hand, when it is determined in step S46 that a node 2 cannot be additionally connected to the immediately downstream side (NO in step S46), the controller 21 sends as a reply the connection acceptance response message MG8-2 including a message indicative to the target node 2 is possible to the node 2 as the transmitter of the upstream node introduction request message MG7 (step S49), shifts to the process in step S9 shown in FIG. 11, and repeats the series of processes.

When it is determined in the step S44 that the target node 2 itself is not a node 2 functioning as a first root node (NO in step S44), the controller 21 checks to see whether the target node 2 which is not a node 2 functioning as the first root node but receives the upstream node introduction request message MG7 or not (step S48). When the message MG7 is received (YES in step S48), the controller 21 shifts to the step S46 and executes the above-described processes. On the other hand, when it is determined in step S48 that the upstream node introduction request message MG7 is not received (NO in step S48), the controller 21 checks to see which one of the first root node registration request message MGr and the first root node deletion request message is received by the target node 2 (step S50).

When one of the first root node registration request message MGr and the first root node deletion request message is received (YES in step S50), the controller 21 determines whether the target node 2 itself is a node 2 functioning as a second root node or not (step S51). When the target node 2 is a node 2 functioning as the second root node (YES in step S51), the controller 21 registers registration information of the first root node as the target of the received first root node registration request message MGr or the first root node deletion request message into the storage 22 of the target node 2 (in the case where the first root node registration request message MGr is received) or deletes the registration information from the storage 2 (in the case where the first root node deletion request message is received) (step S52). The controller 21 shifts to the process in the step S9 shown in FIG. 11 and repeats the series of processes. On the other hand, when it is determined in step S51 that the target node 2 itself is not a node 2 functioning as the second root node (NO in step S51), to transmit the first root node registration request message MGr or the first root node deletion request message to another node 2 functioning as the second root node, the controller 21 relays the first root node registration request message MGr or the first root node deletion request message on the basis of the routing information according to the DHT algorithm (step S53). The controller 21 shifts to the process in step S9 shown in FIG. 11 and repeats the series of processes.

On the other hand, when it is determined in the step S50 that neither the first root node registration request message MGr nor the first root node deletion request message is received (NO in step S50), the controller 21 checks to see whether one of the not-shown upstream node introduction request message for making another node 2 participate in the second overlay network OL and the leaving request message for making another node 2 leaving the second overlay network OL is received or not (step S54). In the case where the not-shown upstream node introduction request message or the leaving request message is received (YES in step S54), the controller 21 updates the routing information stored in the storage 22 of the target node 2 so as to correspond to the respective received message (step S55). After that, based on whether the target node 2 itself is a second root node or not, the controller 21 checks to see whether one of the not-shown upstream node introduction request message and the leaving request message has to be relayed to another node 2 or not (step S56). In the case where the target node 2 is a second root node, process on one of the not-shown upstream node introduction request message and the leaving request message is finished in the target node 2 itself so that it is unnecessary to relay the message (NO in step S56). The controller 21 shifts to the process in step S9 shown in FIG. 11 and repeats the series of processes. On the other hand, when the target node 2 itself is not a second root node, one of the not-shown upstream node introduction request message and the leaving request message has to be relayed to another node 2 as a second root node (YES in step S56). Consequently, the controller 21 relays one of the not-shown upstream node introduction request message and the leaving request message on the basis of the routing information in the target node 2 (step S57), shifts to the process in step S9 shown in FIG. 11, and repeats the above-described series of processes.

When it is determined in the step S54 that neither the not-shown upstream node introduction request message nor the leaving request message is received (NO in step S54), finally, the controller 21 checks to see whether the preset wait time has elapsed or not in counting of the introduction wait timer (see step S7 in FIG. 11) (step S58). When the wait time has not elapsed (NO in step S58), while continuing the counting, the controller 21 shifts to the process in step S9 shown in FIG. 11 and repeats the series of processes. On the other hand, when the wait time has elapsed (YES in step S58), the controller 21 sends again the upstream node introduction request message MG7 similar to that sent in the step S6 to a first root node (as the target node 2) (whose location information has been obtained as a part of the plurality of pieces of location information in the step S5) different from the first root node as the transmission destination in the step S6 (step S59). The controller 21 starts again counting of the introduction waiting timer (step S60), shifts to the process in step S9 shown in FIG. 11, and repeats the above-described series of processes.

(II) Processes of Topology Controller

Next, processes performed in the topology controller 3 of the first example will be concretely described with reference to FIG. 14.

In the topology controller 3 of the first example, as shown in FIG. 14, when the power supply switch of the topology controller 3 is turned on, first, the controller 35 initializes each of the programs and the components stored in the topology controller 3 so that a message can be received from the nodes 2 and the broadcasting station 1 (step S61).

After completion of the initialization, the controller 35 checks to see whether the registration request message from a new broadcasting station 1 or the deletion request message from an existing broadcasting station 1 in the distribution system $S_1$ has received or not (step S62). When one of the messages is received (YES in step S62), in the case of registering a new broadcasting station 1, the controller 35 registers the location information of the broadcasting station 1 into the database and registers information of a new channel and the like into the database of the topology. In the case of deleting the existing broadcasting station 1, the controller 35 deletes the location information or the like of the broadcasting station 1 from the database and, further, deletes the corresponding channel information from the database of the topology (steps S63 and S64).

After that, the controller 35 determines whether the service of the topology controller 3 is stopped or not (step S65). In the case of stopping the service (YES in step S65), the controller 35 turns off the power supply of the topology controller 3 and finishes the process. On the other hand, when it is determined in the step S65 that the service is continued (NO in step S65), the controller 35 returns to the step S62 and repeats the series of processes.

On the other hand, when it is determined in the step S62 that neither the registration request message from the broadcasting station 1 nor the deletion request message is received (NO in step S62), the controller 35 determines whether the upstream node introduction request message MG1 is received from a node 2 newly participating in the distribution system $S_1$ or not (step S66).

When the upstream node introduction request message MG1 is received (YES in step S66), the controller 35 retrieves a candidate of a node 2 (for example, the node 2j in the case of FIG. 2) capable of connecting a node 2 which has sent the upstream node introduction request message MG1 to the downstream side from the stored database of the topology (step S67). After that, the controller 35 sends the location information or the like of the node 2 corresponding to the retrieved candidate as the upstream node candidate message MG2 to the node 2 as the requester (step S68), and shifts to the process in the step S65.

On the other hand, when it is determined in step S66 that the upstream introduction request message MG1 is not also received (NO in step S66), the controller 35 checks to see whether or not the participation report message (see step S16 in FIG. 11) or the leaving report message (see step S28 in FIG. 12) is received from any of the nodes 2 (step S69).

When the participation report message or the leaving report message is received (YES in step S69), the controller 35 determines that there is a change in the topology on the basis of the received report message, updates the database of the topology on the basis of the message (step S70), and shifts to the process in the step S65.

Finally, when it is determined in the step S69 that neither the participation report message nor the leaving report message is received (NO in step S69), the controller 35 shifts to the process in the step S65.

Second Example

Next, concrete configurations and processes of the broadcasting station 1, the nodes 2, the topology controller 3, and the cache server 4 belonging to the distribution system $S_4$ of the fourth embodiment will be described as a second example with reference to FIGS. 15 to 18.

Figure 15:
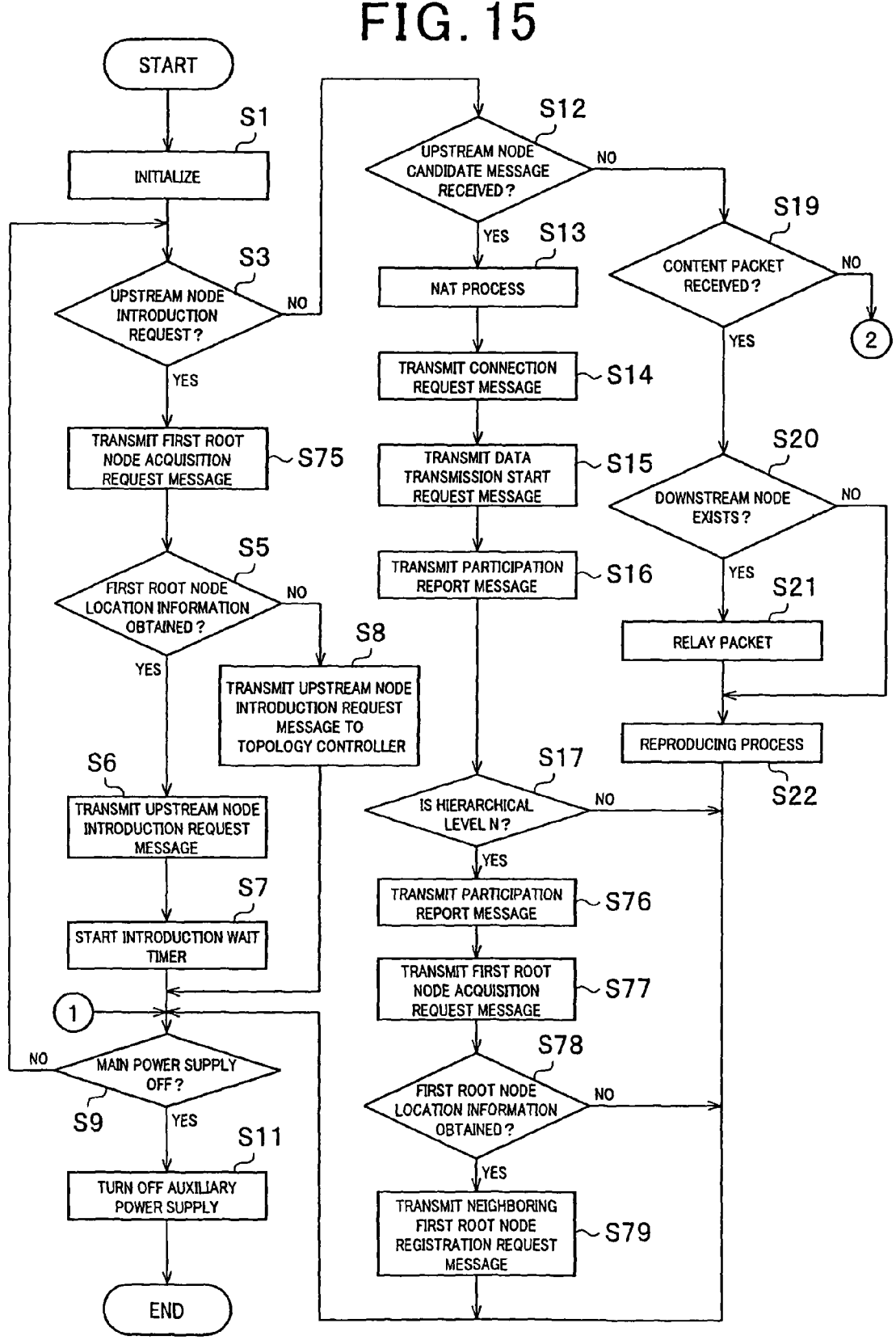
FIG. 15 is a flowchart (I) showing processes in the node in the second example.
Figure 16:
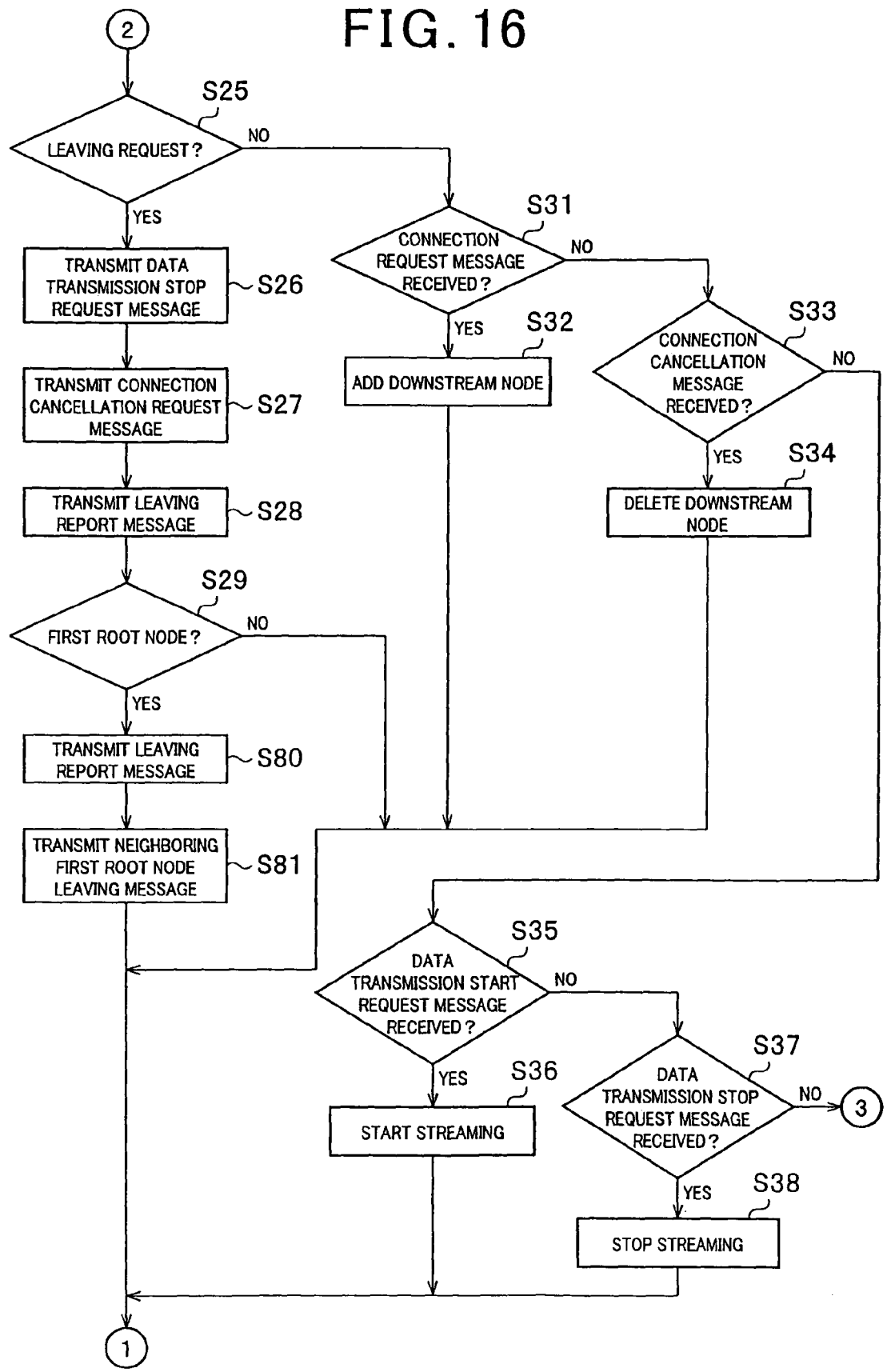
FIG. 16 is flowchart (II) showing processes in the node in the second example.
Figure 17:
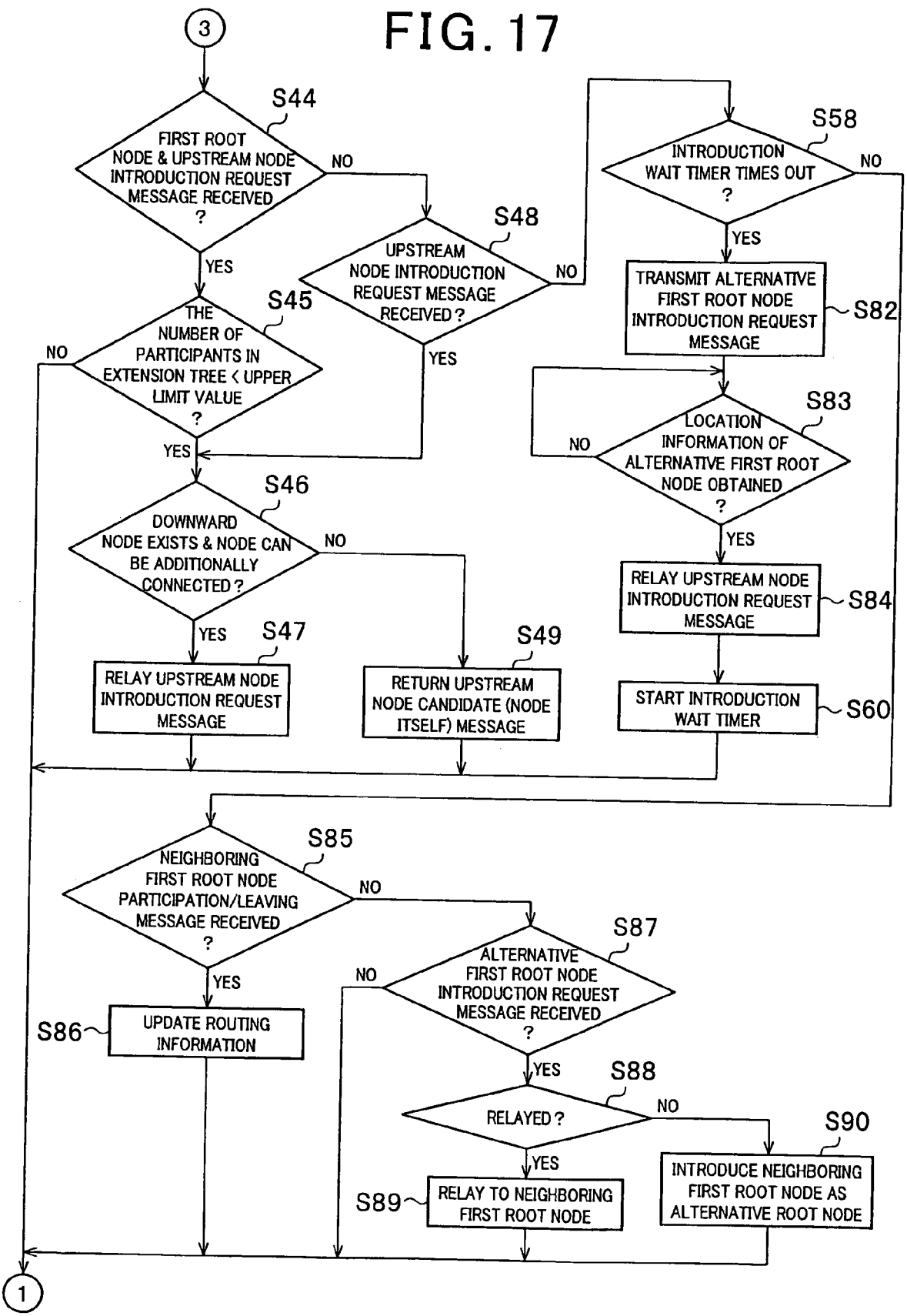
FIG. 17 is a flowchart (III) showing processes in the node in the second example.
Figure 18:
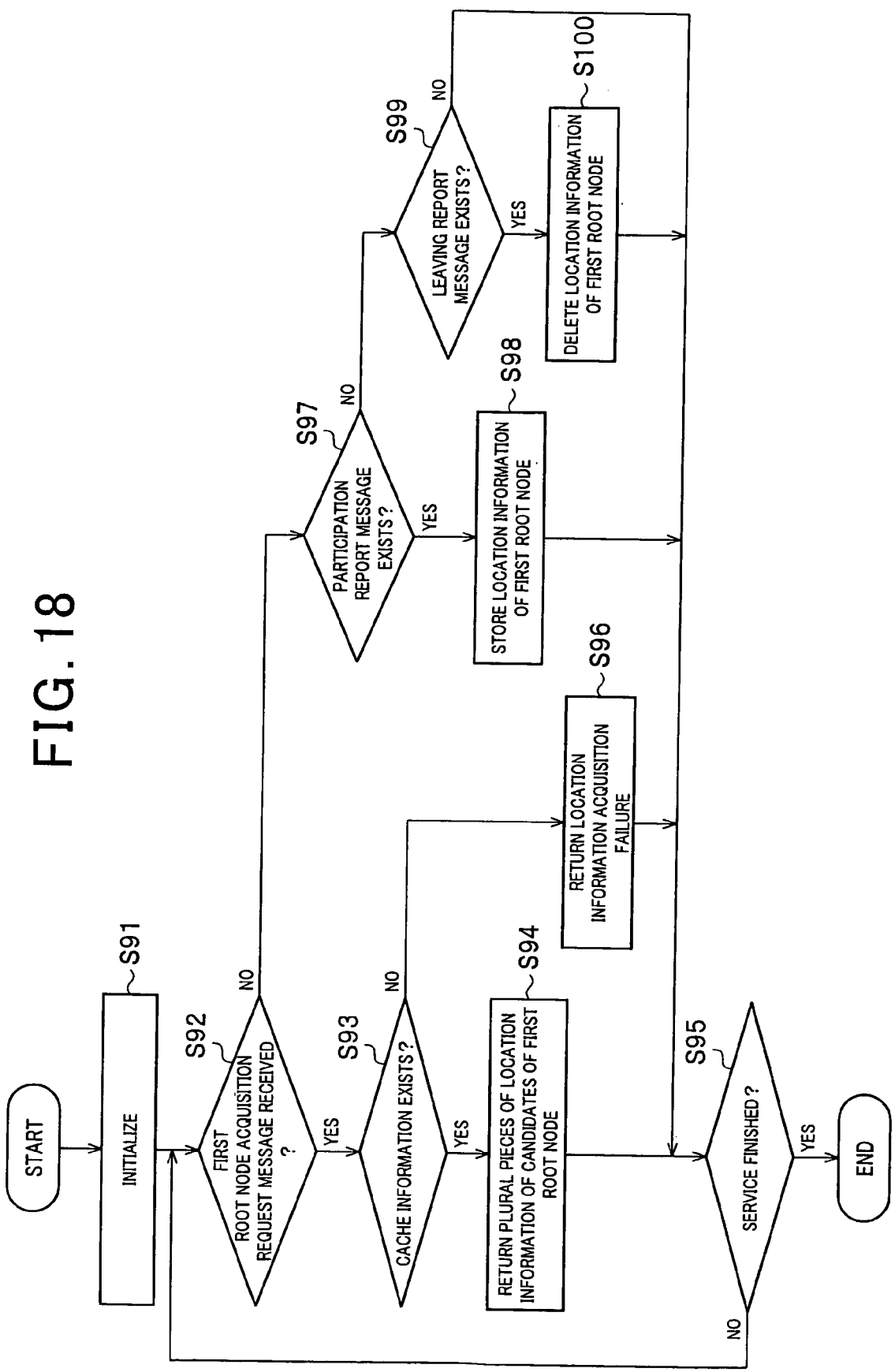
FIG. 18 is a flowchart showing processes in a cache server in the second example.

FIGS. 15 to 17 are flowcharts showing processes according to the second example executed in the representative node 2. FIG. 18 is a flowchart showing processes according to the second example executed in the cache server 4.

The hardware configurations of the broadcasting station, the nodes, and the topology controller of the second example are basically similar to those of the broadcasting station 1, the nodes 2, and the topology controller 3 of the first example. Consequently, in the following second example, the same reference numerals are designated to components similar to the broadcasting station 1, the nodes 2, and the topology controller 3 in the first example and the description of the details will be omitted. In FIGS. 15 to 17 described below, similar step numbers are designated to processes similar to those in FIGS. 11 to 13 described as the first example, and the description of the details will be omitted. Further, the hardware configuration of the cache server 4 of the second example is basically similar to that of the topology controller 3 of the first example. In the following second example, therefore, reference numerals similar to those of the topology controller 3 of the first example are designated, and the configuration of the cache server 4 is not shown.

(I) Processes in Node

First, processes in the node 2 included in the distribution system $S_4$ of the fourth embodiment will be described with reference to FIGS. 15 to 17. Each of the nodes 2 in the second example executes the same processes as those of FIGS. 15 to 17 like the case of the first example. Consequently, a single node 2 can be the first root node or the second root node in the fourth embodiment.

With reference to FIG. 15, the participation process (steps S1 to S17 and steps S75 to S79) executed in each of the nodes 2 of the second example to the received packet relaying process and reproducing process (steps S19 to S22) will be described.

As shown in FIG. 15, when the power supply switch is turned on in any of the nodes 2 in the second example (hereinafter, the node 2 whose processes will be described with reference to FIGS. 15 to 17 will be called a target node 2 like in the first example) and a main power source and an auxiliary power source in the target node 2 are turned on, the processes in steps S1 and S3 like in those of the target node 2 in the first example (see FIG. 11) are executed.

Next, when it is determined in the step S3 that an operation of making the target node 2 participate in the distribution system $S_4$ is performed in the target node 2 (YES in step S3), the controller 21 transmits the first root node introduction request message MG20 to the cache server 4 (step S75, see FIG. 7).

After that, the processes in steps S5 to S9 and S11 (refer to FIG. 11) similar to those of the target node 2 in the first example are executed.

On the other hand, when it is determined in the step S3 for the first time that the participation operation is not performed or it is determined in the step S3 for the second or subsequent times that the upstream node introduction request message MG1 or MG20 has been transmitted to the topology controller 3 or the cache server 4 (NO in step S3), processes in steps S12 to S17 (refer to FIG. 11) similar to those of the target node 2 in the first example are executed.

When it is determined in the step S17 that the target node 2 participates in the N-th level and can be the first root node (YES in step S17), the controller 21 transmits a participation report message similar to that in the process in the step S16 to the cache server 4 (step S76). The controller 21 transmits a not-shown first root node acquisition request message indicative of a request for acquiring location information IP or the like indicative of another first root node already participating in the distribution system $S_4$ to the cache server 4 (step S77).

After that, the controller 21 monitors whether the location information IP or the like indicative of the another first root node can be obtained or not (step S78). When the location information IP cannot be obtained (NO in step S78), the target node 2 is registered as the first root node in the cache node 4 for the first time. The controller 21 shifts to the step S9 and repeats the above-described series of processes.

On the other hand, when it is determined in the step S78 that the location information IP or the like indicative of another first root node could be obtained (YES in step S78), the controller 21 transmits a not-shown neighboring first root node registration request message requesting for registration of the another first root node into the cache server 4 in order to establish a connection between the target node 2 and the another first root node and to expand the mesh-type overlay network MOL (step S79). The controller 21 shifts to the step S9 and repeats the above-described series of processes.

On the other hand, when it is determined in the step S12 that although the process of participation in the distribution system $S_4$ is complete, the upstream node candidate message MG2 has not been received yet (NO in step S12), the processes in steps S19 to S22 (refer to FIG. 11) similar to those of the target node 2 in the first example are executed.

Next, processes after the process in the step S19 in which no packet is received from the node 2 on the upstream side (NO in step S19) will be described with reference to FIG. 16. Referring to FIG. 16, the leaving process executed in the target node 2 in the second example (steps S25 to S29 and steps S80 and S81), the participation process and the leaving process of another node 2 which is newly participating on the downstream side of the target node 2 (steps S31 to S34), and processes from the start to the end of distribution of content data in the second example (steps S35 to S38) will be described.

When it is determined in the step S19 shown in FIG. 15 that no packet is received (NO in step S19), as shown in FIG. 16, processes in steps S25 to S29 (refer to FIG. 12) similar to those of the target node 2 in the first example are executed.

When it is determined in the step S29 that the target node 2 itself is the first root node (YES in step S29), the controller 21 sends a not-shown leaving report message indicative of leaving the distribution system $S_4$ to the cache server 4 (step S80). The controller 21 sends a not-shown neighboring first root node leaving message indicative of leaving the distribution system $S_4$ to a neighboring first root node connected to the target node 2 (see step S79 in FIG. 15) (step S81). The controller 21 shifts to the process in the step S9 shown in FIG. 15 and repeats the above-described series of processes.

On the other hand, when it is determined in step S25 that the operation of leaving the distribution system $S_4$ is not performed (NO in step S25), the processes in step S31 to S38 (refer to FIG. 12) similar to those of the target node 2 in the first example are executed.

Next, processes performed after it is determined in the step S37 that the data transmission stop request message MG10 is not also received (NO in step S37) will be described with reference to FIG. 17. Referring to FIG. 17, the process of participating in the extension tree ET in the second example (refer to FIG. 7) will be mainly described.

When it is determined in step S37 shown in FIG. 16 that the data transmission stop request message MG10 is not also received (NO in step S37), as shown in FIG. 17, first, the processes in steps S44 to S49 and step S58 (refer to FIG. 13) similar to those of the target node 2 of the first example are executed.

When it is determined in the step S58 that preset wait time has not elapsed (NO in step S58), while continuing the counting, the controller 21 shifts to the process in step S9 shown in FIG. 15 and repeats the series of processes. On the other hand, when the wait time has elapsed (YES in step S58), the controller 21 sends the first root node introduction request message MG20 for introducing a first root node replacing the known first root node (that is, a spare of the first root node (refer to step S75 in FIG. 15) obtained from the cache server 4) (step S82, see FIG. 7). The controller 21 monitors whether or not the location information IP of the first root node as the replacement is sent as the connection acceptance response message MG8-2 in response to the first root node introduction request message MG20 from the first root node as the replacement (step S83).

As long as necessary location information IP is not obtained in the determination of the step S83 (NO in step S83), the controller 21 continues the monitoring. When the necessary location information IP is obtained (YES in step S83), the controller 21 relays the upstream node introduction request message MG7 to the first root node indicated by the obtained location information IP (step S84). The controller 21 starts again counting of the introduction waiting timer (step S60), shifts to the process in step S9 shown in FIG. 15, and repeats the above-described series of processes.

On the other hand, when it is determined in the step S58 that the wait time has not elapsed (NO in step S58), the controller 21 determines whether or not one of the neighboring first root node registration request message (refer to step S79 in FIG. 15) and the neighboring first root node leaving message (refer to step S81 in FIG. 16) has been received in the target node 2 (step S85). In the case where one of the neighboring first root node registration request message and the neighboring first root node leaving message has been received (YES in step S85), the controller 21 updates routing information stored in the storage 22 in the target node 2 so as to correspond to each of messages (step S86), shifts to the process in step S9 shown in FIG. 15, and repeats the above-described series of processes.

On the other hand, when it is determined in the step S85 that neither the neighboring first root node registration request message nor the neighboring first root node leaving message is received (NO in step S85), the controller 21 determines whether or not the target node 2 receives the first root node introduction request message MG20 introducing the first root node as a replacement (step S87). When the first root node introduction request message MG20 is received (YES in step S87), the controller 21 determines whether or not the received message MG20 is relayed to another node 2 on the basis of a preset decision criterion (step S88). In the case where the message MG20 is to be relayed (YES in step S88), the controller 21 transfers the first root node introduction request message MG20 to the neighboring first root node (step S89), shifts to the process in step S9 shown in FIG. 15, and repeats the series of processes.

On the other hand, when it is determined in the step S88 that the first root node introduction request message MG20 is not to be relayed (NO in step S88), the controller 21 sends the location information IP or the like of a neighboring first root node as an alternative of the target node 2 to the transmitter of the first root node introduction request message MG20 (step S90), shifts to the process in the step S9 shown in FIG. 15, and repeats the above-described series of processes.

(II) Processes of Cache Server

Next, processes performed in the cache server 4 of the second example will be concretely described with reference to FIG. 18. Since processes in the topology controller 3 in the second example are basically similar to those of the topology controller 3 in the first example, the description will be omitted hereinbelow.

In the cache server 4 of the second example, as shown in FIG. 18, when the power supply switch of the cache server 4 is turned on, first, the controller 35 initializes each of the programs stored in the cache server 4 and the components so that a message can be received from the nodes 2 and the broadcasting station 1 (step S91).

After completion of the initialization, the controller 35 checks to see whether the not-shown first root node acquisition request message is received from a new node 2 or not (refer to step S77 in FIG. 15) (step S92). When the not-shown first root node acquisition request message is received (YES in step S92), the controller 35 checks to see whether cache information (primary memory information including the location information IP of the first root node) indicative of the first root node is stored in the storage 36 or not (step S93). When the cache information is stored (YES in step S93), the controller 35 extracts a plurality of pieces of cache information from first root nodes corresponding to the stored cache information, and transmits the location information IP or the like included in the extracted cache information to the node 2 which has sent the not-shown first root node acquisition request message (step S94).

After that, the controller 35 determines whether the service of the cache server 4 is stopped or not (step S95). When the service is stopped (YES in step S95), the controller 35 turns off the power source of the cache server 4 and finishes the process. On the other hand, when it is determined in step S95 that the service is continued (NO in step S95), the controller 35 returns to the step S92 and repeats the series of processes.

When it is determined in the step S93 that cache information is not stored in any of the first root nodes (NO in step S93), the controller 35 transmits a not-shown acquisition failure message to the node 2 which has transmitted the not-shown first root node acquisition request message (step S96), and shifts to the step S95.

On the other hand, when it is determined in the step S92 that the not-shown first root node acquisition request message is not received (NO in step S92), the controller 35 determines step by step whether or not the participation report message (refer to step S76 in FIG. 15) from the node 2 newly participating in the overlay network MOL is received or the leaving report message (refer to step S80 in FIG. 15) from the node 2 left the overlay network MOL (steps S97 and S99).

When the participation report message is received (YES in step S97), the controller 35 stores the location information IP or the like of the first root node included in the received participation report message into the storage 35 of the cache server 4 (step S98), and shifts to the process in the step S95.

In the case where the participation report message is not received (NO in step S97) but the leaving report message is received (YES in step S99), the controller 35 deletes the location information IP or the like of the first root node included in the received leaving report message from the storage 35 of the cache server 4 (step S100), and shifts to the process in the step S95.

Further, when it is determined in the step S99 that the leaving report message is not also received (NO in step S99), the controller 35 shifts to the process in the step S95.

As described above, by the operations of the distribution system $S_1$ of the first embodiment and the first example, the topology of the extension tree ET using, as the apex, the node 2 as a first root node belonging to the base tree BT is controlled by the node as the first root node. Therefore, occurrence of overload on the topology controller 3 caused when the topology controller 3 controls the topologies of all of nodes 2 constructing the distribution system $S_1$ can be prevented.

Since the topology of each of the nodes 2 belonging to the base tree BT using the broadcasting station 1 as the apex in the whole distribution system $S_1$ is controlled by a dedicated topology controller 3, the topology of a node 2 belonging to the so-called upstream side in a distribution path is optimally controlled. As a result, content can be distributed stably in the distribution system $S_1$ as a whole.

Therefore, both reduction in the processing load on the topology controller 3 and improvement in stability in distribution of content of the network system $S_1$ can be realized with good balance.

Since the number of nodes 2 controlled by the topology controller 3 in the base tree BT is determined by the controllable number of topologies in the connection distribution introduction server 3, a flexible system can be designed in which the device performance of the topology controller 3 is specified according to the stability (reliability) of the topology requested for the distribution system $S_1$ can be designed.

Further, the node 2 belonging to a level immediately lower than a level corresponding to the number N of acceptable levels of the base tree BT is designated as a first root node of the extension tree ET, and information indicative of the information is stored in the storage 22 of the designated node 2. Consequently, the rule of selecting a node 2 playing the role of the first root node becomes simpler, and the workload on system mounting can be lessened.

Further, since the number of nodes 2 belonging to the extension tree ET is smaller than that of nodes 2 belonging to the base tree BT, the control load on the topology of the node 2 belonging to the extension tree ET is lessened, and distribution of content in the extension tree ET can be stabilized.

At least location information for identifying a node 2 as the first root node in the extension tree ET is stored in any of nodes 2 (second root nodes) constructing the virtual overlay network OL. Consequently, a node 2, which is newly participating in the distribution system S1, can promptly retrieve/find the node as the first root node at the time of participation.

As the operation of the distribution system $S_2$ of the second embodiment, the node 2 belonging to any of a plurality of levels including a level corresponding to the number N of acceptable levels of the base tree BT is designated as a first root node of the extension tree ET, and a message indicative of the information is stored in the storage 22 of the designated node 2. Thus, a selection criterion in which the actual result of operation on the base tree BT is considered can be introduced at the time of selecting a node 2 playing the role of the first root node (for example, a node 2 whose content relay quality is stable can be selected as the node 2 as the first root node).

Further, as the operation of the distribution system $S_3$ of the third embodiment, the node 2 as the first root node is designated in consideration of not only the level to which the node 2 belongs but also at least one of distributability of content and working time in the distribution system $S_3$. Consequently, the node 2 stably functioning as the first root node in each of the extension trees ET can be designated.

Further, as the operation of a node 2 newly participating in the distribution system S, when participation in the base tree BT is determined, the upstream node introduction request message MG1 is transmitted to the topology controller 3 and, when participation in the extension tree ET is determined, the upstream node introduction request message MG7 is transmitted to the node 2 as the first root node retrieved. Thus, a node 2 newly participating in the distribution system S can also promptly participate in any of the trees.

Further, as the operation of a node 2 newly participating in the distribution system S, first, a node as a first root node is retrieved. When anode 2 as the first root node can be retrieved, participation in the extension tree ET is determined. When a node 2 as the first root node cannot be retrieved, participation in the base tree BT is determined. Consequently, the tree in which a new node 2 is to participate can be promptly determined without applying unnecessary burden on the topology controller 3.

Further, by recording a program corresponding to the flowcharts shown in FIGS. 11 to 13 or FIGS. 15 to 17 on an information recording medium such as a flexible disk or a hard disk, or obtaining the program via the Internet and recording it, and reading and executing the program by a general computer, the computer can be utilized as the controller 21 in the node 2 of the embodiment.

Further, by recording a program corresponding to the flowchart shown in FIG. 14 or 18 onto an information recording medium such as a flexible disk or a hard disk, or obtaining the program via the Internet or the like and recording it, and reading and executing the program by a general computer, the computer can be utilized as the controller 35 in the topology controller 3 or the cache server 4 of the embodiment.

As mentioned above, the present invention can be utilized in a field of distribution of content using a distribution system which has a tree structure. In particular, if the present invention is applied to a field of distribution of content in which stop of distribution of content causes inconvenience, such as a real-time broadcasting of a video, and music, and the like, remarkably advantageous effects are produced.

The present invention is not confined to the configuration listed in the foregoing embodiments, but it is easily understood that the person skilled in the art can modify such configurations into various other modes, within the scope of the present invention described in the claims.

The invention claimed is:

1. A network system in which distribution information is distributed from a distributor device that distributes the distribution information via a plurality of information processors connected in a hierarchical tree structure, the plurality of information processors comprising a first group of information processors and a second group of information processors, the plurality of information processors participating in and withdrawing from the network system, the network system comprising:

a first sub-network system, the first sub-network system comprising the first group of information processors connected in a hierarchical tree structure with the distributor device being a first apex;
a second sub-network system, the second sub-network system comprising the second group of information processors connected in a hierarchical tree structure and an apex information processor which is any of the first group of information processors included in the first sub-network system, with the apex information processor being used as a second apex; and
a topology controller configured to control a logical network connection aspect of the first group of information processors belonging to the first sub-network system, wherein the topology controller controls a participation of the plurality of information processors in the network system and a withdrawal of the plurality of information processors from the network system,
wherein the distribution information is distributed through the first group of information processors in the first sub-network system from the distributor device that distributes the distribution information, and the distribution information is distributed from the distributor device to the apex information processor which is the second apex, and to the second group of information processors in the second sub-network system; and
wherein the apex information processor in the second sub-network system has a control unit that controls the logical network connection of the second group of information processors belonging to the second sub-network system using the apex information processor as the apex,
the number of the first group of information processors belonging to the first sub-network system is determined on the basis of pre-determined number of the information processors which can be controlled in the topology controller,
the topology controller has an apex information processor designating unit that designates, as the apex information processor, the information processor belonging to a level corresponding to a number of acceptable levels of the first sub-network system which is preliminarily set on the basis of the pre-determined number of the information processors, and
the information processor designated as the apex information processor has a storing unit that stores designation information indicative of the designation.

2. The network system according to claim 1,
wherein the topology controller has an apex information processor designating unit for designating, as the apex information processor, the information processor belonging to any of a plurality of levels including a level corresponding to the number of acceptable levels of the first sub-network system which is preliminarily set on the basis of the number of controllable logical network connections, and
the information processor designated as the apex information processor has a storing unit for storing designation information indicative of the designation.

3. The network system according to claim 1,
wherein the apex information processor designating unit designates the information processor as the apex information processor also in consideration of at least one of distributability of the distribution information in each of the information processors and working time in the network system of the information processors.

4. The network system according to claim 1,
wherein the number of the second group of information processors belonging to the second sub-network system is smaller than that of the information processors belonging to the first sub-network system.

5. The network system according to claim 1,
wherein a virtual overlay network is constructed by the plurality of information processors included in the network system, and
any of the information processors belonging to the overlay network has a storing unit that stores at least identification information for identifying each of the apex information processors in the network system.

6. The network system according to claim 1, further comprising:
an information processor which newly participates in the network system of claim 1, comprising:
a retrieving unit configured to retrieve any of the apex information processors in the network system;
a determining unit configured to determine participation in which of the first sub-network system or the second sub-network system to participate on the basis of a result of retrieval of the retrieving unit; and
a participation request information transmitting unit, when the determining unit determines participation in the first sub-network system, configured to transmit participation request information indicative of the participation to the topology controller and, when the determining unit determines participation in the second sub-network system, configured to transmit participation request information indicative of the participation to the retrieved apex information processor.

7. The network system according to claim 6,
wherein the determining unit determines participation in the second sub-network system when the apex information processor can be retrieved in a retrieval performed by the retrieving unit, and
determines participation in the first sub-network system when the apex information processor cannot be retrieved in a retrieval performed by the retrieving unit.

8. The network system according to claim 1,
wherein the topology controller controls the logical network connection aspect of each of the first group of information processors belonging to the first sub-network system, wherein the topology controller does not constitute the first sub-network system or the second sub-network system.

9. An information processor included in a first sub-network system,
the first sub-network system comprising a first group of information processors including the information processor connected in a hierarchical tree structure with a distributor device being a first apex, the first sub-network system being included in a network system in which distribution information is distributed from the distributor device that distributes the distribution information via a plurality of information processors connected in a hierarchical tree structure,
the plurality of information processors comprising the first group of information processors and a second group of information processors, the plurality of information processors participating in and withdrawing from the network system, wherein a number of the first group of information processors belonging to the first sub-network system is determined on the basis of pre-determined number of the information processors which can be controlled in a topology controller which is configured to control a logical network connection aspect of the first group of information processors belonging to the first sub-network system, the topology controller designating, as an apex information processor, the information processor belonging to a level corresponding to a number of acceptable levels of the first sub-network system which is preliminary set on the basis of the pre-determined number of the information processors, wherein the distribution information is distributed through the first group of information processors in the first sub-network system from the distributor device that distributes the distribution information, and the distribution information is distributed from the distributor device to the apex information processor which is a second apex, and to a second group of information processors in second sub-network system, the second sub-network system comprising the second group of information processors connected in a hierarchical tree structure with the first information processor being used as the second apex, and the information processor designated as the apex information processor comprising:

a storing unit that stores designation information indicative of the designation; and a control unit configured to control a logical network connection aspect of the second group of information processors belonging to a second sub-network system, wherein the control unit controls a participation of the plurality of information processors in the network system and a withdrawal of the plurality of information processors from the network system.

10. The information processor according to claim 9, wherein the network system comprises a topology controller for controlling a logical network connection aspect of each of the first group of information processors belonging to the first sub-network system, the information processor comprising a switching unit that switches between a first processing and a second processing, the first processing that controls the logical network connection aspect of each of the second group of information processors belonging to the second sub-network system by the control unit in accordance with an instruction of the topology controller, the second processing that connects to the first sub-network system by the topology controller without performing the first processing.

11. A non-transitory computer-readable storage medium that stores a computer-executable program for an information processor, the program comprising:

instructions for designating the information processor in a first sub-network system, the first sub-network system comprising a first group of information processors including the information processor connected in a hierarchical tree structure with a distributor device being a first apex, the first sub-network system being included in a network system in which distribution information is distributed from the distributor device that distributes the distribution information via a plurality of information processors connected in a hierarchical tree structure, the plurality of information processors comprising the first group of information processors and a second group of information processors, the plurality of information processors participating in and withdrawing from the network system, wherein a number of the first group of information processors belonging to the first sub-network system is determined on the basis of pre-determined number of the information processors which can be controlled in a topology controller which is configured to control a logical network connection aspect of the first group of information processors belonging to the first sub-network system, the topology controller designating, as an apex information processor, the information processor belonging to a level corresponding to a number of acceptable levels of the first sub-network system which is preliminary set on the basis of the pre-determined number of the information processors;

instructions for storing designation information that designates the information processor as the apex information processor;

instructions for distributing the distribution information through the information processors from the first group in the first sub-network system from the distributor device that distributes the distribution information, and the distribution information is distributed from the distributor device to the apex information processor which is a second apex, and to a second group of information processors in second sub-network system, the second sub-network system comprising the second group of information processors connected in a hierarchical tree structure with the first information processor being used as the second apex, and instructions for controlling a logical network connection aspect of the second group of information processors belonging to a second sub-network system, wherein the instructions are for controlling a participation of the plurality of information processors in the network system and a withdrawal of the plurality of information processors from the network system.

12. A control method for a network system in which distribution information is distributed from a distributor device that distributes the distribution information via a plurality of information processors connected in a hierarchical tree structure, the plurality of information processors comprising a first group of information processors and a second group of information processors, the plurality of information processors participating in and withdrawing from the network system, the network system comprising a first sub-network system, the first sub-network system comprising the first group of information processors connected in a hierarchical tree structure with the distributor device being a first apex; and a second sub-network system, the second sub-network system comprising the second group of information processors connected in a hierarchical tree structure and an apex information processor which is any of the first group of information processors included in the first sub-network system, with the apex information processor being used as a second apex, the method comprising:

distributing the distribution information through the first group of information processors in the first sub-network system from the distributor device that distributes the distribution information, the distribution information being distributed from the distributor device to the apex information processor which is the second apex, and to the second group of information processors in the second sub-network system, controlling a logical network connection aspect of the first group of information processors belonging to the first sub-network system, the logical network connection aspect of the first group of information processors being controlled by a topology controller; and controlling a logical network connection of the second group of information processors belonging to second sub-network system using the apex information processor as the apex, the logical network connection of the second group of information processors being controlled by the apex information processor, wherein the apex information processor controls a participation of the plurality of information processors in the network system and a withdrawal of the plurality of information processors from the network system, determining a number of the first group of information processors belonging to the first sub-network system on the basis of pre-determined number of the information processors, the number of the first group of information processors being determined by the topology controller, designating, as an apex information processor, the information processor belonging to a level corresponding to a number of acceptable levels of the first sub-network system which is preliminary set on the basis of the pre-determined number of the information processors, the apex information processor being designated by the topology controller, storing designation information indicative of the designation as the apex information processor, the designation information being stored by the apex information processor.

* * * * *